United States Patent
Beausoleil et al.

(10) Patent No.: US 7,836,007 B2
(45) Date of Patent: Nov. 16, 2010

(54) METHODS FOR PREPARING ENTANGLED QUANTUM STATES

(75) Inventors: Raymond G. Beausoleil, Redmond, WA (US); William J. Munro, Bristol (GB); Timothy P. Spillar, Bristol (GB); Pieter Kok, Cardiff (GB); Sean D. Barrett, Bristol (GB); Kae Nemoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 11/343,639

(22) Filed: Jan. 30, 2006

(65) Prior Publication Data

US 2007/0215862 A1    Sep. 20, 2007

(51) Int. Cl.
G06F 15/00    (2006.01)
G06F 15/18    (2006.01)

(52) U.S. Cl. .......................................................... 706/62
(58) Field of Classification Search ..................... 706/62
See application file for complete search history.

(56) References Cited

OTHER PUBLICATIONS

Julian Brown, The Quest for the Quantum Computer, Touchstone, 2001, pp. 262-267.*

'Nearly deterministic linear optical controlled—NOT gate': Nemoto, physical review letters, Dec. 15, 2004, pp. 250502-1 through 250502-4.*

'Quantum non-demolition measurements: a new resource for making linear logic scalable': Nemoto, Aug. 9, 2004, Hewlett Packard.*

'A high efficiency quantum non-demolition single photon number resolving detector': Munro, Sep. 9, 2004, pp. 1-4 quantph/0310066v3.*

* cited by examiner

*Primary Examiner*—Michael B. Holmes
*Assistant Examiner*—Peter Coughlan

(57) ABSTRACT

Various embodiments of the present invention are directed to methods for generating an entangled state of qubits. In one embodiment of the present invention, a method for preparing an entangled state of qubits comprises providing a probe and N non-interacting qubits, each qubit comprises a linear superposition of two basis states. The probe is transmitted into an interaction region that separately couples the probe to each of the qubits and produces a number of different probes. A linear superposition of states is output from the interaction region, each state in the linear superposition of states comprises a tensor product of entangled basis states and one of the different probes. The linear superposition of states is projected into one of the entangled states by measuring the state of the probe.

21 Claims, 24 Drawing Sheets

METHODS FOR PREPARING ENTANGLED QUANTUM STATES

TECHNICAL FIELD

The present invention relates to quantum computation and quantum information, and, in particular, to methods for preparing various entangled states of qubits.

BACKGROUND OF THE INVENTION

A bit is a basic unit of information used by conventional computational systems to process information and store information in information-storage devices, such as magnetic and optical discs. The bit is equivalent to a choice between two mutually exclusive alternatives, such as "on" and "off," and is typically represented by the numbers 0 or 1. Information encoded in bits is called "classical information." In recent years, advancements in the field of physics have given rise to methods of encoding information in discrete, or continuous, states of quantum systems, including electrons, atoms, and photons of electromagnetic radiation. Information encoded in the discrete states of a quantum system is called "quantum information." An elementary quantum system has two discrete states and is called a "qubit." The qubit "basis states" are represented by "$|0\rangle$" and "$|1\rangle$" and are used to represent the bits 0 and 1, respectively. However, unlike the systems used to realize bits in classical information, such a quantum system can be in the state $|0\rangle$, the state $|1\rangle$, or in a state that simultaneously comprises both $|0\rangle$ and $|1\rangle$. These qubit states are represented by a linear superposition of states: $|\psi\rangle = \alpha|0\rangle + \beta|1\rangle$ The parameters $\alpha$ and $\beta$ are complex-valued coefficients satisfying the condition:

$$|\alpha|^2 + |\beta|^2 = 1$$

where $|\alpha|^2$ is the probability of measuring the state $|0\rangle$, and $|\beta|^2$ is the probability of measuring the state $|1\rangle$.

A qubit can exist in any one of an infinite number of linear superpositions until the qubit is measured. When the qubit is measured in the computational basis $|0\rangle$ and $|1\rangle$, the qubit is projected into either the state $|0\rangle$ or the state $|1\rangle$. The infinite number of qubit-linear superpositions can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $-\pi/2 < \theta < \pi/2$ and $0 < \phi \leq \pi$. FIGS. 1A-1C illustrate a Bloch sphere representation of a qubit. In FIG. 1A, lines 101-103 are the orthogonal x, y, and z Cartesian coordinate axes, respectively, and the Bloch sphere 106 is centered at the origin. There are an infinite number of points on the Bloch sphere 106, each point representing a unique linear superposition of the qubit $|\psi\rangle$. For example, a point 108 on the Bloch sphere 106 represents a qubit $|\psi\rangle$ comprising in part the state $|0\rangle$ and in part the state $|1\rangle$. However, once the state of the qubit $|\psi\rangle$ is measured in the computational basis $|0\rangle$ and $|1\rangle$, the qubit $|\psi\rangle$ is projected into the state $|0\rangle$ 110, in FIG. 1B, or the state $|1\rangle$ 112, in FIG. 1C.

Two or more quantum systems can be used to encode bit strings. For example, the four, two-bits strings "00," "01," "10," and "11" can be correspondingly encoded in the two-qubit product states $|0\rangle_1|0\rangle_2, |0\rangle_1|1\rangle_2, |1\rangle_1|0\rangle_2,$ and $|1\rangle_1|1\rangle_2$, where the subscript "1" represents a first qubit system, and the subscript "2" represents a second qubit system. However, the first qubit system and the second qubit system can exist simultaneously in two basis states that are represented by a linear superposition of the product states as follows:

$$|\psi\rangle = \frac{1}{2^{1/2}}(|0\rangle_1 + |1\rangle_1)\frac{1}{2^{1/2}}(|0\rangle_2 + |1\rangle_2)$$

$$= \frac{1}{2}[|0\rangle_1|0\rangle_2 + |0\rangle_1|1\rangle_2 + |1\rangle_1|0\rangle_2 + |1\rangle_1|1\rangle_2]$$

The state $|\psi\rangle$ indicates that by squaring the coefficient ½ there is a ¼ probability of measuring each of the product states $|0\rangle_1|0\rangle_2, |0\rangle_1|1\rangle_2, |1\rangle_1|0\rangle_2,$ and $|1\rangle_1|1\rangle_2$, when the two qubits are measured separately, each in their computation basis. Certain linear superpositions of the product states, called "entangled states," can be used in quantum computing and to process and transmit quantum-information. Quantum entanglement is a quantum mechanical property in which the states of two or more quantum systems are linked to one another, even though the quantum systems may be spatially separated. Such entangled states cannot be written as a simple product of a state for each system. The following linear superpositions, called "the Bell states":

$$|\psi^-\rangle_{12} = \frac{1}{\sqrt{2}}(|0\rangle_1|1\rangle_2 - |1\rangle_1|0\rangle_2),$$

$$|\psi^+\rangle_{12} = \frac{1}{\sqrt{2}}(|0\rangle_1|1\rangle_2 + |1\rangle_1|0\rangle_2),$$

$$|\phi^-\rangle_{12} = \frac{1}{\sqrt{2}}(|0\rangle_1|0\rangle_2 - |1\rangle_1|1\rangle_2), \text{ and}$$

$$|\phi^+\rangle_{12} = \frac{1}{\sqrt{2}}(|0\rangle_1|0\rangle_2 + |1\rangle_1|1\rangle_2)$$

are examples of entangled states. Consider a first qubit system and a second qubit system that have both been prepared in the Bell state $|\psi^+\rangle_{12}$. The square of the coefficient $1/\sqrt{2}$ indicates that when a measurement is performed to determine the state of the first and second qubit systems, there is a ½ probability of obtaining the result $|0\rangle_1|1\rangle_2$ and a ½ probability of obtaining the result $|1\rangle_1|0\rangle_2$. Suppose that after the quantum systems have been spatially separated, the first qubit system is measured and determined to be in the state $|0\rangle_1$. Quantum entanglement ensures that the second qubit system is measured in the state $|1\rangle_2$, in spite of the fact that the two qubit systems are spatially separated and measured at different times.

Entangled qubit states have a number of different and useful quantum-enhanced applications, such as quantum metrology, quantum cryptography, quantum communication, and quantum teleportation. For the sake of simplicity, quantum teleportation is described below as an example of a quantum-enhanced application. Quantum teleportation can be used to transmit quantum information in the absence of a quantum communications channel linking the sender of the quantum information to the recipient of the quantum information. FIG. 2 illustrates an example of quantum teleportation. In FIG. 2, quantum communications channels are represented by directional arrows, such as directional arrow 202, and a classical communications channel is represented by a dashed-line directional arrow 204. Bob receives a qubit $|\psi\rangle_C$ that he needs to transmit to Alice, but Bob does not know the value of the parameters $\alpha$ and $\beta$, and Bob can only transmit classical information over the communications channel 204. Bob can perform a measurement on the qubit, but by the properties of quantum mechanics, a measurement irrevocably destroys most of the qubit information rendering any information that Alice may choose to obtain from $|\psi\rangle_C$ irretrievable. In order for Alice to receive all of the information contained in the qubit $|\psi\rangle_C$, both Bob and Alice agree in advance to share a Bell state generated by an entangled state source 206:

$$|\psi^-\rangle_{AB} = 1/\sqrt{2}(|0\rangle_A|1\rangle_B - |1\rangle_A|0\rangle_B)$$

where the subscript "A" identifies qubit basis states transmitted to Alice, and the subscript "B" identifies qubit basis states transmitted to Bob.

The overall state the system in FIG. 2 is:

$$|\Theta\rangle_{ABC} = |\psi\rangle_C|\psi^-\rangle_{AB} = 1/\sqrt{2}(\alpha|0\rangle_C + \beta|1\rangle_C)(|0\rangle_A|1\rangle_B - |1\rangle_A|0\rangle_B)$$

where the qubit $|\psi\rangle_C$ is represented by $\alpha|0\rangle_C + \beta|1\rangle_C$. The state $|\Theta\rangle_{ABC}$ can be rewritten in terms of the four Bell states as follows:

$$|\Theta\rangle_{ABC} = \frac{1}{2}[|\psi^-\rangle_{BC}(\alpha|0\rangle_A - \beta|1\rangle_A) + |\psi^+\rangle_{BC}(-\alpha|0\rangle_A - \beta|1\rangle_A) + |\phi^-\rangle_{BC}(\beta|0\rangle_A - \alpha|1\rangle_A) + |\phi^+\rangle_{BC}(-\beta|0\rangle_A - \alpha|1\rangle_A)]$$

The state $|\Theta\rangle_{ABC}$ reveals that the Bell states are entangled with the qubits identified by the subscript "A." Bob is in possession of the Bell states identified by the subscript "BC," and Alice is in possession of the qubits identified by the subscript "A," but Alice does not know which of the four qubit states she possesses. Bob and Alice both agree in advance that the strings "00," "01," "10," and "11" correspond to the entangled states $|\psi^-\rangle_{BC}$, $|\psi^+\rangle_{BC}$, $|\phi^-\rangle_{BC}$, and $|\phi^+\rangle_{BC}$ so that when Bob performs a Bell state measurement to determine the Bell states in his possession, he can immediately transmit to Alice the corresponding two-bit string over the communications channel 204. As a result, Alice knows which qubit state she possesses. For example, suppose Bob performs a Bells state measurement that outputs the state $|\psi^+\rangle_{BC}$. Bob's measurement projects the state $|\Theta\rangle_{ABC}$ into the state $|\psi^+\rangle_{BC}(\alpha|0\rangle_A - \beta|1\rangle_A)$. Bob then transmits the string "01" over the communications channel 204 to Alice. Quantum entanglement ensures that Alice knows with certainty that she possesses the qubit state $\alpha|0\rangle_A + \beta|1\rangle_A$, which is equivalent to the original qubit state as the overall phase is unimportant. For the other Bell state measurement outcomes, all of which occur with probability ¼, Alice performs operations on the qubit in order to transform the state into the original unknown state supplied by Bob.

Methods used to generate entangled qubits often employ direct interactions between the qubits being entangled, are limited to either matter-based qubits or photon-based qubits, or necessitate performing numerous measurements. As a result, physicists, computer scientists, and users of quantum information have recognized a need for new methods that can be used to generate entangled qubits in both matter-based and photon-based qubits using a single measurement and indirect interactions between qubits.

SUMMARY OF THE INVENTION

Various embodiments of the present invention are directed to methods for generating an entangled state of qubits. In one embodiment of the present invention, a method for preparing an entangled state of qubits comprises providing a probe and N non-interacting qubits, each qubit comprises a linear superposition of two basis states. The probe is transmitted into an interaction region that separately couples the probe to each of the qubits and produces a number of different probes. A linear superposition of states is output from the interaction region, each state in the linear superposition of states comprises a tensor product of entangled basis states and one of the different probes. The linear superposition of states is projected into one of the entangled states by measuring the state of the probe.

DETAILED DESCRIPTION OF THE INVENTION

Figure 1A:
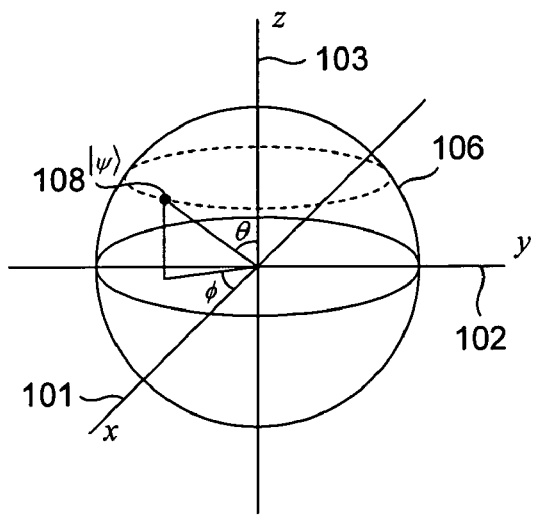
FIGS. 1A-1C illustrate a Bloch sphere representation of a qubit.
Figure 1B:
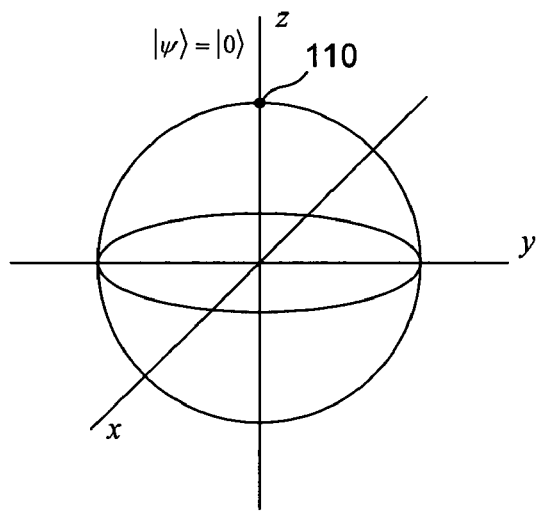
Figure 1C:
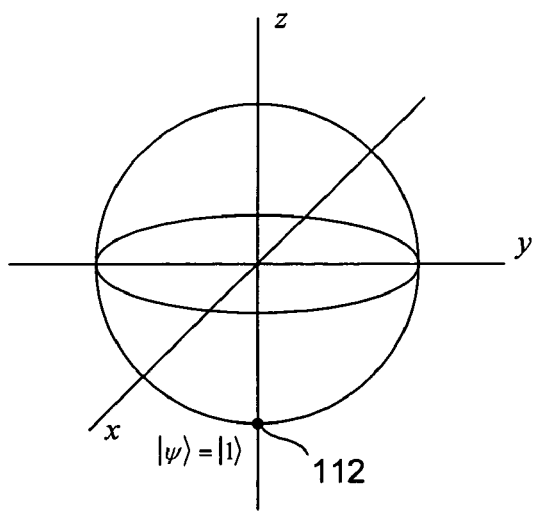
Figure 2:
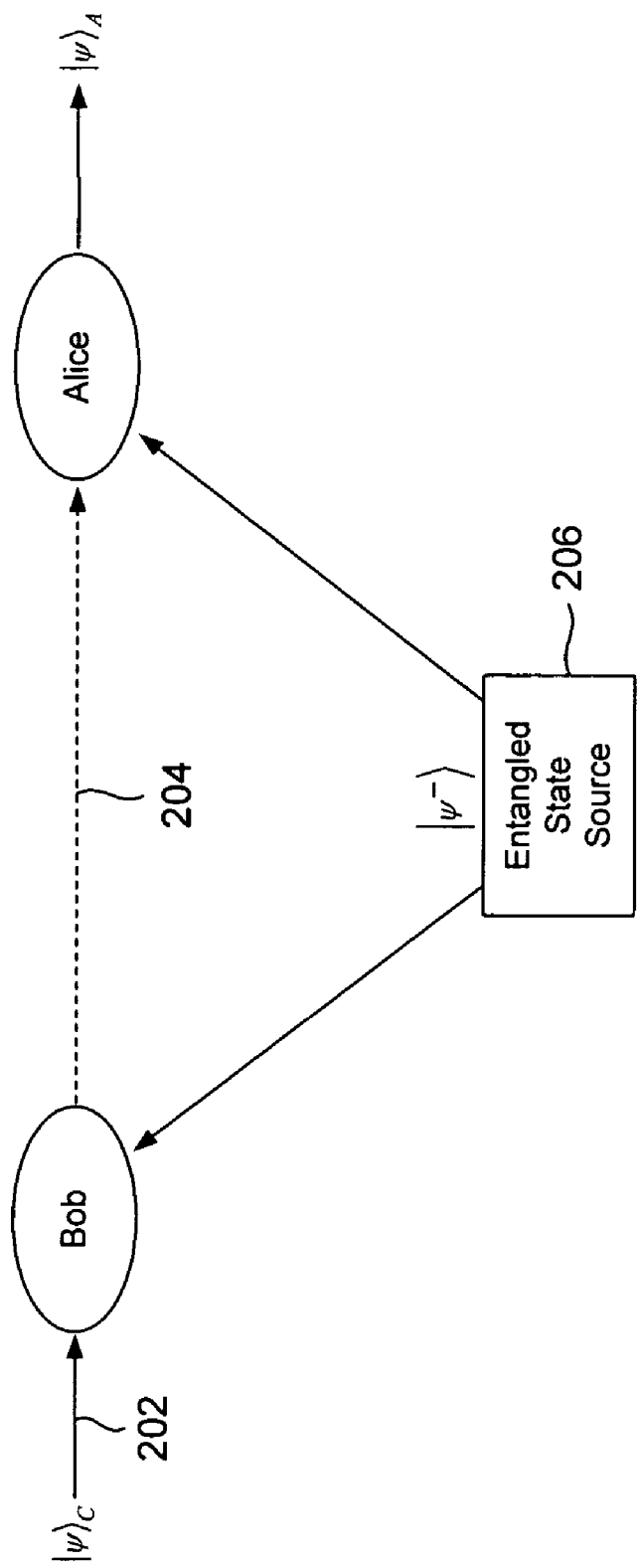
FIG. 2 illustrates an example of quantum teleportation.

Various embodiments of the present invention are directed to methods for generating entangled states of qubits. In order to assist in understanding descriptions of various embodiments of the present invention, an overview of quantum mechanics is provided below, in a first subsection. In a second subsection, an overview of electromagnetic radiation and quantum optics is provided. In a third subsection, an overview of coherent states is provided. In a fourth subsection, an overview of quantum entanglement is provided. Finally, in a fifth subsection, various method embodiments of the present invention are described.

Overview of Quantum Mechanics

Embodiments of the present invention employ concepts in quantum mechanics. The textbook "Modern Quantum Mechanics Revised Edition," J. J. Sakurai, Addison Wesley Publishing Company, New York, 1994, is one reference for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior of systems at the atomic and subatomic levels, which comprise photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546 \times 10^{-34}$ Js. The spin state that corresponds to the spin-angular momentum $\hbar/2$ is referred to as "spin up" and is denoted $|\uparrow\rangle$, and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|\frac{1}{2}\rangle$ and $|-\frac{1}{2}\rangle$, respectively. Also, a single label can be used to represent different states in entirely different quantum systems. For example, the ket "$|1\rangle$" can represent a first quantized vibrational level of a diatomic molecule and can be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where
  i is a non-negative integer, and
  $\psi_i$ is a real value, called an "eigenvalue," that corresponds to a discrete measurable quantity that is observed when the quantum system is in the eigenstate $|\psi_i\rangle$.

For example, a measurement employed to determine the spin angular momentum of an electron is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and}$$

$$\hat{S}_z|\downarrow\rangle = -\frac{\hbar}{2}|\downarrow\rangle$$

The eigenstates are basis vectors of a complex vector space called a "Hilbert space," and the number of eigenstates is the dimension of the Hilbert space. For example, a Hilbert space of an electron is two-dimensional, with eigenstates $|\uparrow\rangle$ and $|\downarrow\rangle$. A Hilbert space with N eigenstates $\{|\psi_i\rangle\}$ is N-dimensional, and any state $|\Psi\rangle$ in the Hilbert space can be written as a linear superposition of the eigenstates as follows:

$$|\Psi\rangle = \sum_{i=1}^{N} c_i|\psi_i\rangle$$

where $c_i$ is a complex valued coefficient called the "amplitude." A Hilbert space also includes a mathematical operation called the "inner product." The inner product of two states $|\Psi\rangle$ and $|\Xi\rangle$ is represented by:

$$\langle\Xi|\Psi\rangle$$

where $|\Xi\rangle$ is called a "bra," and represents the complex conjugate and transpose of the state $|\Xi\rangle$ The inner product has the following property:

$$\langle\Xi|\Psi\rangle = \langle\Psi|\Xi\rangle^*$$

where "*" represents the complex conjugate. The basis eigenstates of a Hilbert space are orthonormal, or in mathematical notation:

$$\langle\psi_i|\psi_j\rangle = \delta_{ij},$$

where $\delta_{ij}$ is "1" when i equals j, and 0 otherwise. For example, the inner product of the eigenstates of a single electron Hilbert space are:

$$\langle\uparrow|\uparrow\rangle = \langle\downarrow|\downarrow\rangle = 1 \text{ and}$$
$$\langle\uparrow|\downarrow\rangle = \langle\downarrow|\uparrow\rangle = 0$$

The orthonomality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^{N} c_i \langle\psi_j|\psi_i\rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle\psi_i|\Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

Because eigenstates of a Hilbert space are orthonormal and provide a basis for the Hilbert space, the eigenstates can be represented by orthogonal normalized column vectors and an operator can be represented by square matrix. For example, the eigenstates of a single electron Hilbert space are represented by the column vectors:

$$|\uparrow\rangle \doteq \begin{bmatrix}1\\0\end{bmatrix}, \text{ and } |\downarrow\rangle \doteq \begin{bmatrix}0\\1\end{bmatrix}$$

where the symbol $\doteq$ stands for the term "is represented by." The complex conjugates and transposes of the eigenstates are represented by the row vectors:

$$\langle\uparrow| \doteq [1 \; 0] \text{ and } \langle\downarrow| \doteq [0 \; 1]$$

Using the completeness relation, an operator $\hat{O}$ on the basis $\{|\psi_i\rangle\}$ can also be represented by:

$$\hat{O} = \sum_{i=1}^{N}\sum_{j=1}^{N} |\psi_i\rangle\langle\psi_i|\hat{O}|\psi_j\rangle\langle\psi_j|$$

where $\{|\psi_i\rangle\}$ is a matrix element. The matrix corresponding to the operator $\hat{O}$ on the basis $\{|\psi_i\rangle\}$ can be represented as follows:

$$\hat{O} \doteq \begin{bmatrix} \langle\psi_1|\hat{O}|\psi_1\rangle & \langle\psi_1|\hat{O}|\psi_2\rangle & \cdots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \cdots & & \langle\psi_N|\hat{O}|\psi_N\rangle \end{bmatrix}$$

For the operator $\hat{O}$ equal to the operator $\hat{\Psi}$, the matrix representation has zero off diagonal elements, and the diagonal elements are the eigenvalues $\{\psi_i\}$. For example, the electron spin operator can be given by:

$$\hat{S}_z = \frac{\hbar}{2}\hat{\sigma}_z$$

where $$\hat{\sigma}_z = |\uparrow\rangle\langle\uparrow| - |\downarrow\rangle\langle\downarrow|$$

The matrix representation of the electron spin operator $\hat{S}_z$ is given by:

$$\hat{S}_z \doteq \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix}$$
$$= \frac{\hbar}{2}\begin{bmatrix}1 & 0\\0 & -1\end{bmatrix}$$

An operator $\hat{O}$ that corresponds to a measurable quantity has matrix elements satisfying the condition:

$$\langle\psi_i|\hat{O}|\psi_j\rangle = \langle\psi_j|\hat{O}|\psi_i\rangle$$

and is said to be a "Hermitian operator."

Prior to a measurement, a quantum system can simultaneously exist in all of the eigenstates of a corresponding Hilbert space, which is represented by the (pure state) linear superposition of states:

$$|\Psi\rangle = \sum_{i=1}^{N} c_i|\psi_i\rangle = \sum_{i=1}^{N} |\psi_i\rangle\langle\psi_i|\Psi\rangle$$

A measurement performed on the quantum system $|\Psi\rangle$ projects the quantum system into one of the eigenstates. In other words, a measurement on a quantum system is essentially a filtering process that places the quantum system into one of the eigenstates in the linear superposition at the time of the measurement. For example, an electron with an unknown spin orientation prior to a measurement exists in a linear superposition of states:

$$|\Psi\rangle = c_1|\uparrow\rangle + c_2|\downarrow\rangle$$

A spin determination measurement $\hat{S}_z$ projects the linear superposition of states into either the state $|\uparrow\rangle$ or the state $|\downarrow\rangle$ at the time of the measurement.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ a quantum system will be projected into, the probability of measuring a particular state $|\psi_i\rangle$ is given by:

$$\text{Probability for } \psi_i = |c_i|^2 = |\langle\psi_i|\Psi\rangle|^2$$

where $|\Psi\rangle$ is normalized, and $|c_i|^2$ equals $c^*_i c_i$ and gives the outcome probability. For example, prior to a spin determination measurement in the spin basis $|\uparrow\rangle$ and $|\downarrow\rangle$, consider an electron with a ½ probability of being in the spin state $|\uparrow\rangle$ or the spin state $|\downarrow\rangle$. The linear superposition of the electron in such as spine state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of measurement on an ensemble of quantum systems that are described by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N}\langle\Psi|\psi_i\rangle\langle\psi_i|\hat{\Psi}|\psi_j\rangle\langle\psi_j|\Psi\rangle$$
$$= \sum_{i=1}^{N}\psi_i|\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states of each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue of the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi}\otimes\hat{\Xi})(|\psi\rangle\otimes|\xi\rangle) = (\hat{\Psi}|\psi\rangle)\otimes(\hat{\Xi}|\xi\rangle)$$

where $|\Psi\rangle$ represents a state in the Hilbert space $H_\Psi$, and $|\xi\rangle$ represents a state in the Hilbert space $H_\Xi$. The tensor product $|\psi\rangle\otimes|\xi\rangle$ can be abbreviated as $|\psi\rangle|\xi\rangle, |\psi,\xi\rangle$, or $|\psi\xi\rangle$. The spin states of two electrons in an atomic orbital is an example of a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow\uparrow\rangle_{12} = |\uparrow\uparrow\rangle_{12}$$

where the subscripts 1 and 2 refer to the first and second electrons.

In quantum mechanics, there are also measurable quantities with continuous eigenvalue spectrums. The dimensionality of the corresponding Hilbert spaces are infinite and many of the properties described above for discrete quantum systems can be generalized for continuous quantum systems. A continuous eigenvalue equation is:

$$\hat{\zeta}|\zeta\rangle = \zeta|\zeta\rangle$$

where $\zeta$ represents a continuous eigenvalue, and the ket $|\zeta\rangle$ is a continuous eigenstate of the operator $\hat{\zeta}$. For example, for an unbound particle, both position q and momentum p are continuous eigenvalues of the position and momentum operators $\hat{q}$ and $\hat{p}$, respectively, and can assume any real value between $-\infty$ and $\infty$.

The properties of the continuous variable $\zeta$ can be generalized as follows:

$$\langle\zeta|\zeta'\rangle = \delta(\zeta - \zeta'),$$
$$\int_{-\infty}^{\infty} d\zeta|\zeta\rangle\langle\zeta| = 1, \text{ and}$$
$$\langle\zeta|\hat{\zeta}|\zeta'\rangle = \zeta'\delta(\zeta - \zeta')$$

where $$\delta(\zeta - \zeta') = \lim_{\Delta\to 0} \frac{1}{\sqrt{2\pi\Delta^2}}\exp\left(-\frac{(\zeta - \zeta')^2}{2\Delta^2}\right)$$

A state ket for an arbitrary physical state can be expanded in terms of the states $\{|\zeta\rangle\}$ as follows:

$$|\alpha\rangle = \int_{-\infty}^{\infty} d\zeta|\zeta\rangle\langle\zeta|\alpha\rangle$$

For example, consider placing in the path of a particle a detector that outputs the position of the particle when the particle is at the position q. Immediately after the measurement is taken, the system, initially in the state $|\alpha\rangle$, is projected into the state represented by $|q\rangle$ in much the same way an arbitrary electron-spin state is projected into one of the two spin states when a spin detection measurement is performed. Other properties of the continuous variable $\zeta$ are given by:

$$\int_{-\infty}^{\infty} d\zeta |\langle \zeta | \alpha \rangle|^2 = 1, \text{ and}$$

$$\langle \beta | \alpha \rangle = \int_{-\infty}^{\infty} d\zeta \langle \beta | \zeta \rangle \langle \zeta | \alpha \rangle$$

The momentum operator $\hat{p}$ can also be represented by a differential operator $-i\hbar\partial/\partial q$. As a result, both the position and momentum operators satisfy the canonical commutation relations:

$$[\hat{q}_i, \hat{q}_j] = 0$$
$$[\hat{p}_i, \hat{p}_j] = 0, \text{ and}$$
$$[\hat{q}_i, \hat{q}_j] = 0 = i\hbar \delta_{ij}$$

where
i and j represent orthogonal coordinates, such as the Cartesian x, y, and z coordinates, and
the commutator is defined as $[A, B] = AB - BA$.

An Overview of Electromagnetic Radiation and Quantum Optics

In this subsection, a brief description of electromagnetic radiation and quantum optics that relates to embodiments of the present invention is described. The textbooks "Quantum Optics," M. O. Scully and M. S. Zubairy, Cambridge University Press, Cambridge, United Kingdom, 1997, and "The Quantum Theory of Light (3rd Edition)," R. Loudon, Oxford University Press, New York, 2000 are two of many references for quantum optics. Additional details can be obtained from the above-referenced textbooks, or from many other textbooks, papers, and journal articles in this field.

Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2} \frac{\partial^2 \vec{A}}{\partial t^2} = 0$$

and the Coulomb, non-relativistic gauge condition:

$$\nabla \cdot \vec{A}(\vec{r},t) = 0$$

where the electric and magnetic field components are determined by:

$$\vec{E}(\vec{r}, t) = -\frac{\partial \vec{A}(\vec{r}, t)}{\partial t}, \text{ and}$$

$$\vec{B}(\vec{r}, t) = \nabla \times \vec{A}(\vec{r}, t)$$

Figure 3:
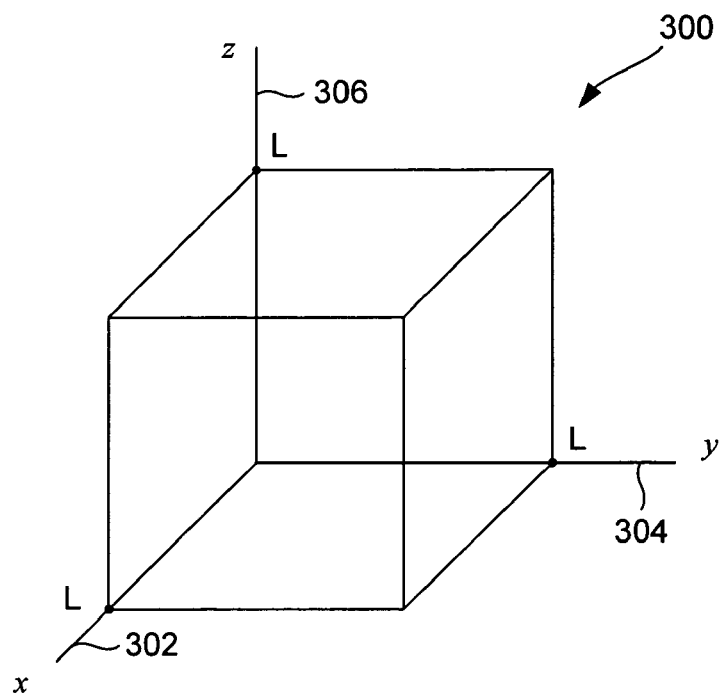
FIG. 3 illustrates a cubic cavity.

The electromagnetic radiation is assumed to be confined in a cubic cavity with perfectly reflecting walls, where the lengths of the walls L are much longer than the wavelengths of the electromagnetic radiation. FIG. 3 illustrates a cubic cavity 300. Orthogonal axes 302, 304, and 306 represent the x, y, and z Cartesian coordinate axes. The finite dimensional cubic cavity 300 imposes periodic boundary conditions on solutions to the wave equation. For example, in the x, y, and z-directions, plane wave solutions to the vector potential wave equation satisfy the condition:

$$\exp(i\vec{k} \cdot \vec{r}) = \exp(i\vec{k} \cdot (\vec{r} + \vec{L}))$$

where $\vec{L}$ is (L,L,L), and $\vec{k}$ is called the "wavevector" with components:

$$\vec{k} = \frac{2\pi}{L}(m_x, m_y, m_z), \text{ and}$$

$m_x$, $m_y$, and $m_z$ are integers.

Each set of integers $(m_x, m_y, m_z)$ specifies a normal mode of the electromagnetic radiation, and the magnitude of the wavevector $\vec{k}$, k, is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A vector potential solution to the wave equation above that satisfies the periodic boundary conditions is:

$$A(r, t) = \sum_{\vec{k},s} \vec{e}_{\vec{k}s} \left( A_{\vec{k}s} e^{i(\vec{k}\cdot\vec{r}-\omega_k t)} + A^*_{\vec{k}s} e^{-i(\vec{k}\cdot\vec{r}-\omega_k t)} \right)$$

where $A_{\vec{k}s}$ is a complex amplitude of the electromagnetic radiation, and $\vec{e}_{\vec{k}s}$ represents two unit-length polarization vectors. The sum over $\vec{k}$ represents the sum over the integers $(m_x, m_y, m_z)$, and the sum over s is the sum over the two independent polarizations that are associated with each $\vec{k}$. The two polarization vectors are orthogonal as indicated by:

$$\vec{e}_{\vec{k}s} \cdot \vec{e}_{\vec{k}s'} = \delta_{ss'}$$

and from the gauge condition given above:

$$\vec{k} \cdot \vec{e}_{\vec{k}s} = 0$$

for both polarization directions s. The two polarization vectors $\vec{e}_{\vec{k}1}$ and $\vec{e}_{\vec{k}2}$ form a right-handed coordinate system with a normalized wavevector given by:

$$\vec{e}_{\vec{k}1} \times \vec{e}_{\vec{k}2} = \frac{\vec{k}}{|\vec{k}|} = \vec{\kappa}$$

Figure 4:
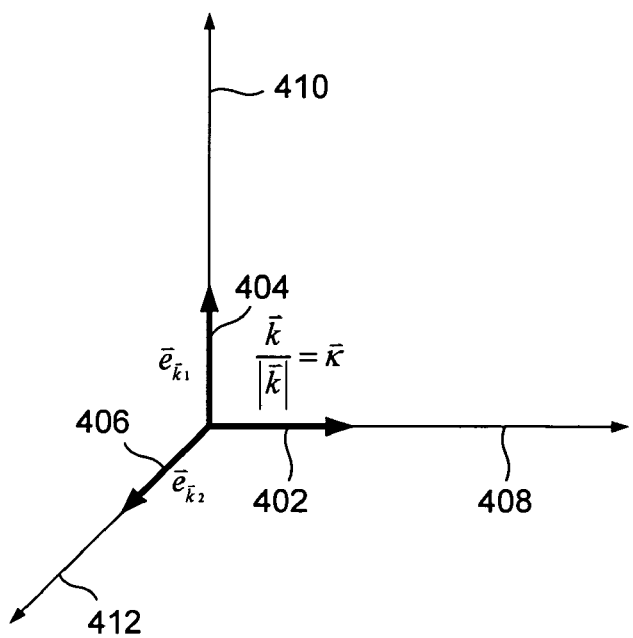
FIG. 4 illustrates a three-dimensional coordinate system with two independent polarization vectors and a normalized wavevector as basis vectors.

FIG. 4 illustrates a three-dimensional right-handed coordinate system with two independent polarization vectors $\vec{e}_{\vec{k}s}$ and a normalized wavevector $\vec{\kappa}$ as basis vectors. In FIG. 4, the wavevector $\vec{\kappa}$ 402, and the polarization vectors, $\vec{e}_{\vec{k}1}$ 404 and $\vec{e}_{\vec{k}2}$ 406, are three orthogonal unit length basis vectors of a coordinate system with coordinate axes represented by lines 408, 410, and 412, respectively.

The electric and magnetic field components of the vector potential are:

$$\vec{E}(\vec{r},t) = i\sum_{\vec{k},s} \omega_k \vec{e}_{\vec{k}s}\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right], \text{ and}$$

$$\vec{B}(\vec{r},t) = \frac{i}{c}\sum_{\vec{k},s} \omega_k (\vec{\kappa}\times\vec{e}_{\vec{k}s})\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right]$$

Both the electric field $\vec{E}(\vec{r},t)$ and magnetic field $\vec{B}(\vec{r},t)$ are referred to as the "classical" representation of the electric and magnetic field, are orthogonal to one another, and are both orthogonal to the wavevector $\vec{k}$.

Figure 5:
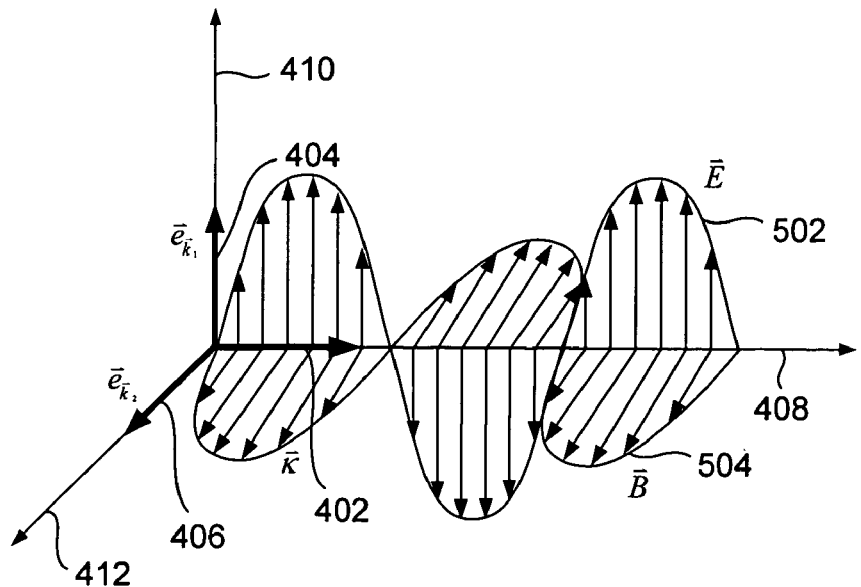
FIG. 5 illustrates a representation of electric and magnetic field components of electromagnetic radiation in the coordinate system shown in FIG. 4.

FIG. 5 illustrates a representation of electric and magnetic field components of electromagnetic radiation in the right-handed coordinate system shown in FIG. 4. The electromagnetic radiation is directed along the wavevector $\vec{\kappa}$ 402 axis. The electric field component $\vec{E}(\vec{r},t)$ 502 and magnetic field component $\vec{B}(\vec{r},t)$ 504 are directed along the orthogonal polarization vectors $\vec{e}_{\vec{k}1}$ 404 and $\vec{e}_{\vec{k}2}$ 406, respectively.

The energy of the electromagnetic radiation can be determined by evaluating the Hamiltonian:

$$H = \frac{1}{2}\int_V \left(\varepsilon_0 \vec{E}\cdot\vec{E} + \frac{1}{\mu_0}\vec{B}\cdot\vec{B}\right)dV$$

$$= 2\varepsilon_0 V \sum_{\vec{k},s} \omega_k^2 A_{\vec{k}s} A^*_{\vec{k}s}$$

where $\varepsilon_0$ is the electric permittivity of free space,
$\mu_0$ is the magnetic permeability of free space, and
V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\varepsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\vec{E}(\vec{r},t)$ and magnetic field $\vec{B}(\vec{r},t)$ components, the canonical variables for position, $q_{\vec{k}s}$, and momentum, $p_{\vec{k}s}$, are introduced into the Hamiltonian by setting:

$$A_{\vec{k}s} = \frac{1}{2\omega_k\sqrt{\varepsilon_0 V}}(\omega_k q_{\vec{k}s} + ip_{\vec{k}s})$$

As a result, the Hamiltonian for the electromagnetic radiation becomes:

$$H = \frac{1}{2}\sum_{\vec{k},s}(p_{\vec{k}s}^2 + \omega_k^2 q_{\vec{k}s}^2)$$

Each term in the Hamiltonian is the energy of a harmonic oscillator with vibrational mode $\vec{k}s$, where the term $p_{\vec{k}s}^2/2$ is the kinetic energy, and the term $\omega_k q_{\vec{k}s}^2/2$ is the potential energy of a harmonic oscillator with a unit mass. The Hamiltonian is quantized by replacing the position and momentum variables $q_{\vec{k}s}$ and $p_{\vec{k}s}$ with quantum mechanical position and momentum operators $\hat{q}_{\vec{k}s}$ and $\hat{p}_{\vec{k}s}$, respectively, to give the quantum Hamiltonian operator:

$$\hat{H} = \frac{1}{2}\sum_{\vec{k},s}(\hat{p}_{\vec{k}s}^2 + \omega_k^2 \hat{q}_{\vec{k}s}^2)$$

Annihilation and creation operators are defined by:

$$\hat{a}_{\vec{k}s} = \frac{1}{\sqrt{2\hbar\omega_k}}(\omega_k \hat{q}_{\vec{k}s} + i\hat{p}_{\vec{k}s}), \text{ and}$$

$$\hat{a}^\dagger_{\vec{k}s} = \frac{1}{\sqrt{2\hbar\omega_k}}(\omega_k \hat{q}_{\vec{k}s} - i\hat{p}_{\vec{k}s}),$$

and substituting the annihilation and creation operators into the quantum Hamiltonian operator gives:

$$\hat{H} = \sum_{\vec{k},s} \hbar\omega_k\left(\hat{a}^\dagger_{\vec{k}s}\hat{a}_{\vec{k}s} + \frac{1}{2}\right)$$

where $\hat{a}^\dagger_{\vec{k}s}\hat{a}_{\vec{k}s}$ is called the "number operator" and is also denoted by $\hat{n}_{\vec{k}s}$. Using the canonical commutation relations for the position and momentum operators, the annihilation and creation operators satisfy the commutation relations given by:

$$[\hat{a}_{\vec{k}s}, \hat{a}_{\vec{k}'s'}] = 0 = [\hat{a}^\dagger_{\vec{k}s}, \hat{a}^\dagger_{\vec{k}'s'}]$$

-continued $$[\hat{a}_{\vec{k}s}, \hat{a}^\dagger_{\vec{k}'s'}] = \delta_{\vec{k}\vec{k}'}\delta_{ss'}$$

When the electromagnetic radiation is quantized, the amplitudes $A_{\vec{k}s}$ become operators:

$$\hat{A}_{\vec{k}s} = \sqrt{\frac{\hbar}{2\omega_k \varepsilon_0 V}}\, \hat{a}_{\vec{k}s}$$

which can be substituted into the classical electric and magnetic field equations above to obtain electric and magnetic field operators:

$$\hat{E}(\vec{r}, t) = i\sum_{\vec{k},s} \sqrt{\frac{\hbar\omega}{2\varepsilon_0 V}}\, e_{\vec{k}s}[\hat{a}_{\vec{k}s}e^{i(k\cdot r - \omega_k t)} - \hat{a}^\dagger_{\vec{k}s}e^{-i(k\cdot r - \omega_k t)}], \text{ and}$$

$$\hat{B}(\vec{r}, t) = \frac{i}{c}\sum_{\vec{k},s}(\vec{K}\times e_{\vec{k}s})\sqrt{\frac{\hbar\omega}{2\varepsilon_0 V}}\, e_{\vec{k}s}[\hat{a}_{\vec{k}s}e^{i(k\cdot r - \omega_k t)} - \hat{a}^\dagger_{\vec{k}s}e^{-i(k\cdot r - \omega_k t)}]$$

Both the electric and magnetic field operators are Hermitian and represent measurable electric and magnetic fields.

Most electromagnetic radiation interactions with matter result from the electric field component rather than the magnetic field component, because the magnetic field is smaller than the electric field by the factor 1/c. As a result, the electric field alone is generally used to characterize the behavior of electromagnetic radiation and any interactions with matter, and the magnetic field component can be ignored.

Quantum computation and quantum information processing systems can be operated using a single-mode $\vec{k}$s of electromagnetic radiation. As a result, the Hamiltonian operator for a single-mode of electromagnetic radiation reduces to:

$$\hat{H} = \hbar\omega\left(\hat{a}^\dagger\hat{a} + \frac{1}{2}\right)$$

where $\hat{a}$ and $\hat{a}^\dagger$ replace the operators $\hat{a}_{\vec{k}_j s_j}$ and at $\hat{a}^\dagger_{\vec{k}_j s_j}$ in the Hamiltonian above. The eigenstates and the corresponding energy eigenvalues of the single-mode Hamiltonian are:

$$\hat{H}|n\rangle = \hbar\omega\left(\hat{a}^\dagger\hat{a} + \frac{1}{2}\right)|n\rangle = E_n|n\rangle$$

where $|n\rangle$ is called a "number state," n is a nonnegative integer called a "photon number," and $E_n$ is an energy eigenvalue.

The annihilation and creation operators operate on a number state as follows:

$$\hat{a}|n\rangle = \sqrt{n}\,|n-1\rangle,$$

$$\hat{a}^\dagger|n\rangle = \sqrt{n+1}\,|n+1\rangle, \text{ and}$$

-continued $$\hat{n}|n\rangle = n|n\rangle$$

where $\hat{n}$ represents the operator $\hat{a}^\dagger\hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle$$

where $|0\rangle$ is called the "vacuum state," which represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$$\langle n'|n\rangle = \delta_{n'n}, \text{ and } \sum_{n=0}^{\infty}|n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle,$$

$$\text{and } \hat{H}(\hat{a}^\dagger|n\rangle) = \hbar\omega\left(n + \frac{3}{2}\right)|n+1\rangle = (E_n + \hbar\omega)|n+1\rangle$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 6:
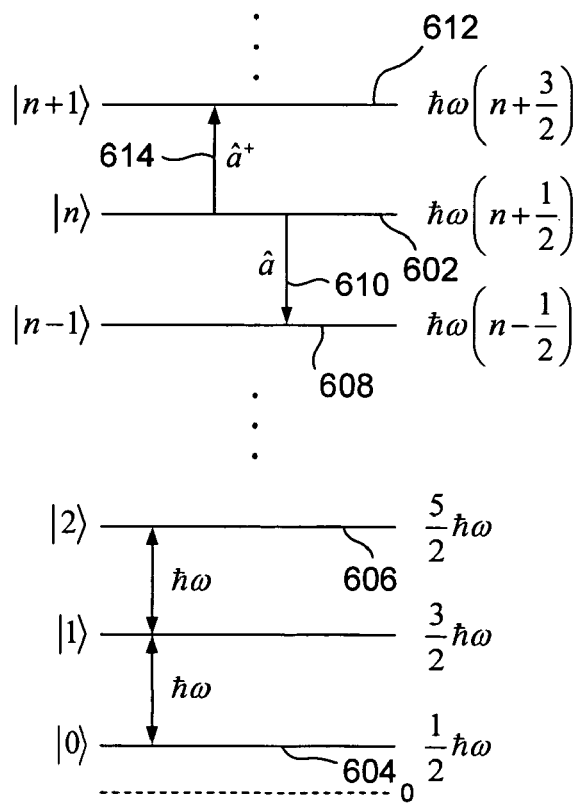
FIG. 6 is an energy-level diagram of quantized electromagnetic radiation.

FIG. 6 is an energy level diagram of quantized electromagnetic radiation. Horizontal lines, such as horizontal line 602, represent energy levels of electromagnetic radiation. Energy level 604 is the lowest energy level, which corresponds to the vacuum state $|0\rangle$. The energy of the vacuum state is $\hbar\omega/2$ or ½ the energy of a single photon. Higher energy levels of electromagnetic radiation are each separated by the same quantum of energy $\hbar\omega$. For example, the energy level 606 represents electromagnetic radiation with a total electromagnetic energy of 5 $\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator $\hat{a}$ represents an electromagnetic-radiation transition 608 from the state $|n\rangle$ 602 to the lower energy state $|n+1\rangle$ 610. The transition 608 is achieved by giving up a photon to the surroundings. By contrast, the creation operator $\hat{a}^\dagger$ represents an electromagnetic-radiation transition 612 from the state $|n\rangle$ 602 to the higher energy state $|n+1\rangle$ 614. The transition 612 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Both the creation and annihilation operators are not Hermitian. As a result, the operators $\hat{a}$ and $\hat{a}^\dagger$ cannot represent measurable quantities. However, the annihilation and creation operators can be used to construct the following Hermitian quadrature operators:

$$\hat{X} = \sqrt{\frac{m\omega}{2\hbar}}\,\hat{q} = \frac{1}{2}(\hat{a}+\hat{a}^\dagger), \text{ and } \hat{Y} = \frac{\hat{p}}{\sqrt{2m\hbar\omega}} = \frac{1}{2}i(\hat{a}^\dagger - \hat{a})$$

The quadrature operators are essentially dimensionless position and momentum operators and are associated with the electric field amplitudes oscillating out of phase with each other by 90°. The energy eigenvalue can be rewritten in terms of the quadrature operators as:

$$\hat{H} = \hbar\omega(\hat{X}^2+\hat{Y}^2)|n\rangle = \hbar\omega(n+\tfrac{1}{2})|n\rangle$$

The number states have the quadrature-operator eigenvalue property:

$$(\hat{X}^2+\hat{Y}^2)|n\rangle = (n+\tfrac{1}{2})|n\rangle$$

and the number states have identical properties for the $\hat{X}$ and $\hat{Y}$ quadrature operators. For example, the quadrature-operator-expectation values:

$$\langle n|\hat{X}|n\rangle = \langle n|\hat{Y}|n\rangle = 0$$

The quadrature operators can be used to construct a phase-space diagram of the number states.

Figure 7:
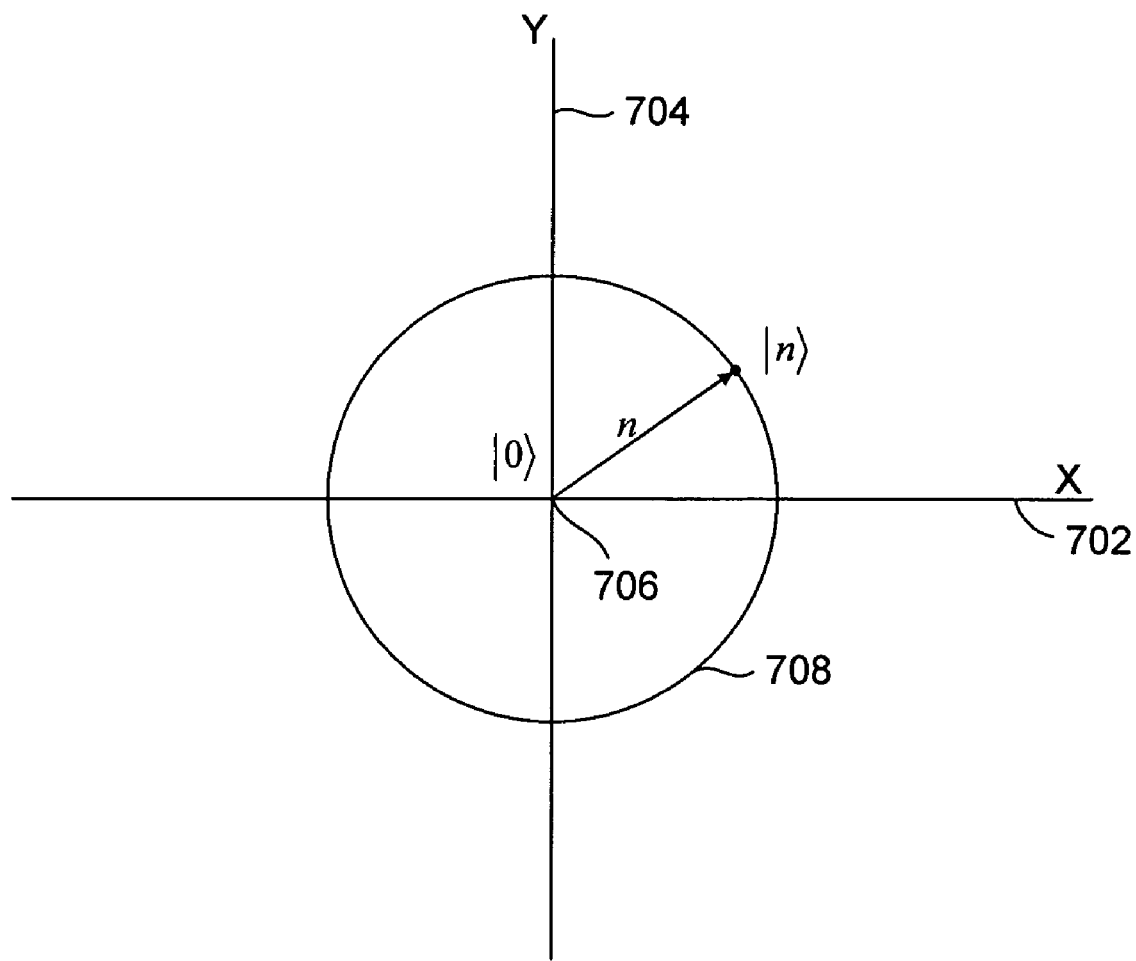
FIG. 7 is a phase space diagram of a number state.

FIG. 7 is a phase space diagram of a number state. Horizontal line 702 is the X quadrature axis, and vertical line 704 is the Y quadrature axis. The origin 706 corresponds to the vacuum state $|0\rangle$, and circle 708 is a qualitative representation of a number state $|n\rangle$, where the radius of the circle 708 is the number of photons n. The number state $|n\rangle$ can be located anywhere on the circle 708, which indicates that uncertainty in the number of photons is zero, but the phase angle associated with the number state is entirely undefined, so measurement will give all possible outcomes with equal probability.

The number states also have the property:

$$\Sigma = \langle n|\hat{E}(t)|n\rangle = 0$$

where $\Sigma$ is called a coherent signal. The zero valued coherent signal of a photon state is consistent with the sinusoidal variation of the electric field with time at a fixed observation point.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{\frac{1}{4}} \exp\{-i\omega_0 t - \Delta^2(t_0-t)^2\}$$

where $\omega_0$ is the central frequency of the pulse spectrum, t is time, $t_0$ is the time at which the peak of the wavepacket is located at a distance $z_0$ from the photon source, and $\Delta^2$ is the variance of the intensity spectrum. The time $t_0$ can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt|\xi(t)|^2 = 1$$

The probability of photodetection of a photon in the time interval $(t_1,t_2)$ at a distance $z_0$ from the photon source is given by:

$$\text{Probability of } (t_1 < t_2) = \int_{t_1}^{t_2} dt|\xi(t)|^2$$

Figure 8:
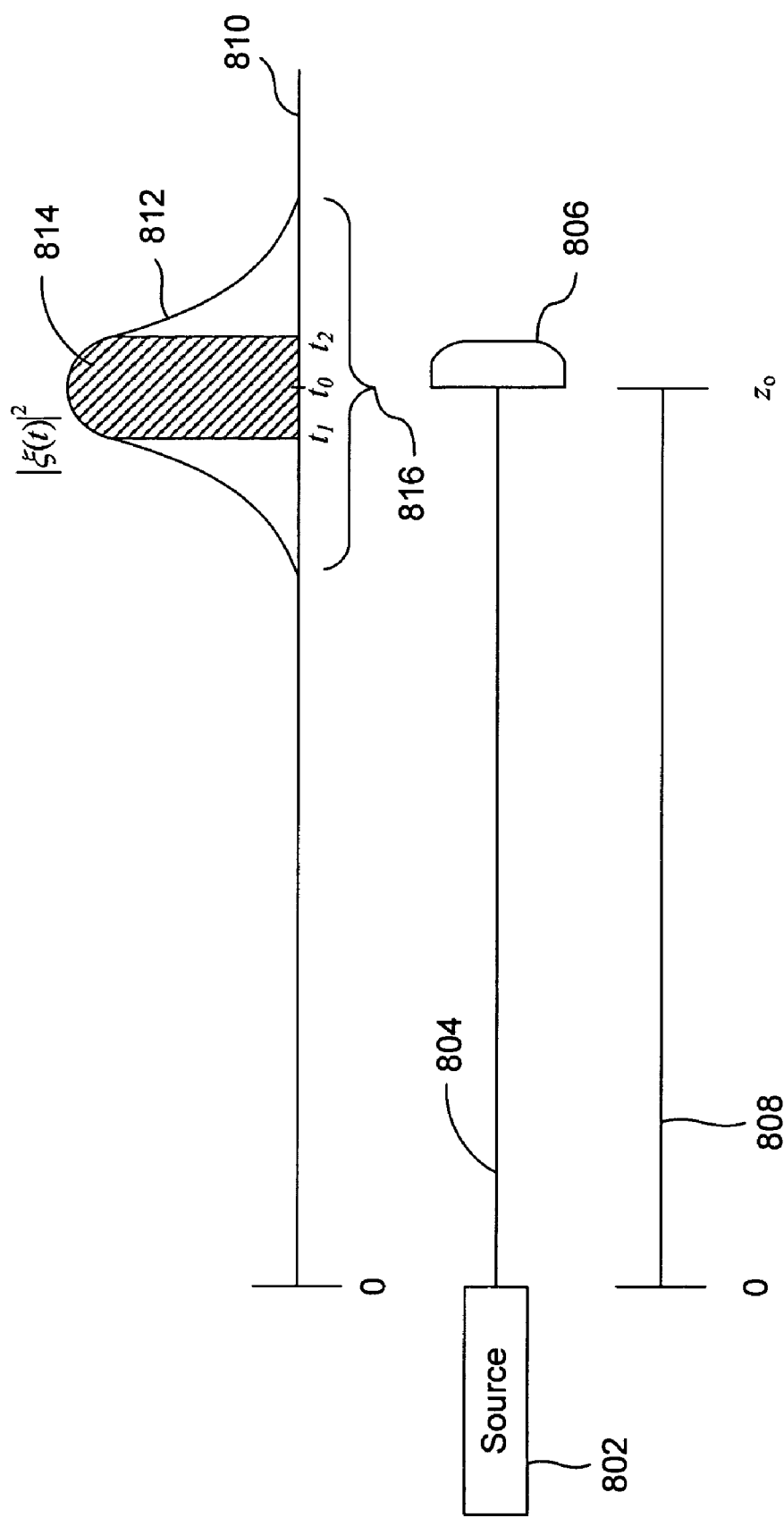
FIG. 8 illustrates a probability distribution function associated with a pulse output from a source and transmitted to a detector.

FIG. 8 illustrates a probability distribution associated with a pulse output from a source 802 and transmitted in an optical fiber 804 to a detector 806. The horizontal line 808 represents the distance $z_0$ the photon travels from the source 802 to the detector 806, and the horizontal line 810 is a time axis. The curve 812 represents the photodetection probability density function $|\xi(t)|^2$. In FIG. 8, the photodetection probability density function $|\xi(t)|^2$ 812 is centered at the time $t_0$, which corresponds to the time a pulse takes to travel the distance $z_0$. An area under the curve 812 represents the probability of detecting the pulse within a particular time period. For example, hash-marked region 814 represents the probability of detecting the photon within the time period $t_1 < t_0 < t_2$. Time period 816 is called a "time bin" and corresponds to the time period within which the photon is detected at the detector 806.

The time dependent creation operators can be used to generate a photon wavepacket creation operator as follows:

$$\hat{a}_\xi^\dagger = \int_{-\infty}^{\infty} dt \xi(t) \hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}}|0\rangle$$

where $|0\rangle$ is the continuous-mode vacuum state. The continuous-mode number states satisfy the following same conditions:

$$\hat{n}|n_\xi\rangle = n|n_\xi\rangle$$
$$\langle n'_\xi | n_\xi \rangle = \delta_{n'n}, \text{ and}$$
$$\sum_{n_\xi=0}^{\infty} |n_\xi\rangle\langle n_\xi| = 1$$

As a result, the subscript $\xi$ used to identify continuous-mode number states can be dropped. Note that the wavepacket constructed photon is not an eigenstate of any Hamiltonian.

An Overview of Coherent States

The most common kind of single-mode states are linear superpositions of the number states. There are a number of different possible linear superpositions of the number states, but the coherent state:

$$|\alpha\rangle = \exp\left(-\frac{1}{2}|\alpha|^2\right) \sum_{n=0}^{\infty} \frac{\alpha^n}{\sqrt{n!}} |n\rangle$$

is a linear superposition of the number states used in many applications of quantized electromagnetic radiation. The coherent states are eigenstates of the annihilation operator:

$$\hat{a}|\alpha\rangle = \alpha|\alpha\rangle$$

where taking the complex conjugate gives:

$$\langle\alpha|\hat{a}^\dagger = \langle\alpha|\alpha^*$$

However, the coherent state $|\alpha\rangle$ is not an eigenstate of the creation operator at because the summation over $\alpha$ cannot be rearranged to give the coherent state from $\hat{a}^\dagger|\alpha\rangle$.

The coherent state expectation value for the number operator:

$$\langle n\rangle = \langle\alpha|\hat{n}|\alpha\rangle = |\alpha|^2$$

indicates that $|\alpha|^2$ is the mean number of photons. The probability of detecting n photons in a measurement of the number of photons is a Poisson distribution:

$$P_n = |\langle n|\alpha\rangle|^2 = \exp(-|\alpha|^2)\frac{|\alpha|^{2n}}{n!}$$

The Poisson distribution approaches a Gaussian distribution for large values of $|\alpha|^2$.

The coherent state is a quantum state whose properties most closely resemble a classical electromagnetic wave of stable amplitude and fixed phase. For example, the electric field operator corresponding to an electric field propagating in the z direction, with the mode subscripts k and s removed, is:

$$\hat{E}(\Omega) = \frac{1}{2}(\hat{a}e^{-i\Omega} + \hat{a}^\dagger e^{i\Omega})$$
$$= \hat{X}\cos\Omega + \hat{Y}\sin\Omega$$

where the time t and displacement z are contained in the phase angle:

$$\Omega(z,t) = \omega t - kz - \frac{\pi}{2}$$

and the electric field is measured in units of $\sqrt{\hbar\omega/2\epsilon_0 V}$.

The coherent state is a nearly classical state because it gives the correct sinusoidal form for the electric field expectation value or coherent signal:

$$\Sigma = \langle\alpha|\hat{E}(\Omega)|\alpha\rangle$$
$$= |\alpha|\cos(\Omega - \phi)$$

where $\alpha = |\alpha|e^{i\phi}$, and $\phi$ is the mean phase angle of the coherent state excitation of the mode.

Figure 9:
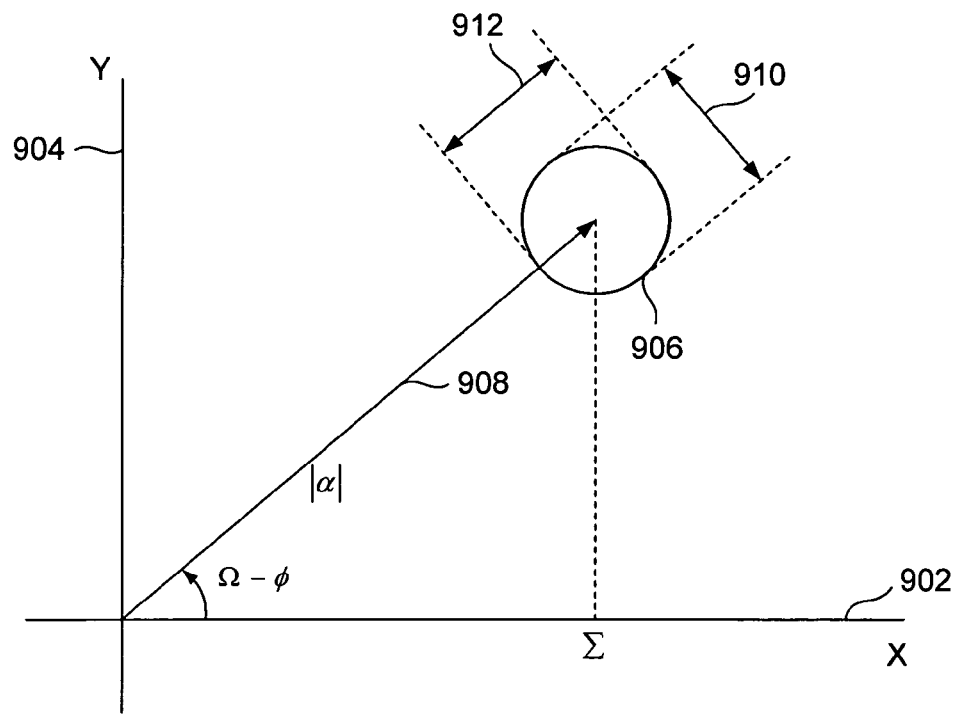
FIG. 9 is a phase-space diagram of a coherent state.

FIG. 9 is a phase-space diagram of a coherent state. Horizontal axis 902 is the X quadrature axis, and vertical axis 904 is the Y quadrature axis. Disk 906 represents an area of uncertainty associated with the phase and average number of photons of a coherent state $|\alpha\rangle$, the fluctuations being equal in all directions of phase space. Directional arrow 908 represents the amplitude $|\alpha|$, or the mean number of photons, and $(\Omega-\phi)$ is the angle above the X quadrature axis. The uncertainty disk is resolved into a photon-number uncertainty and phase uncertainty, as indicated by directional arrows 910 and 912, respectively. Directional arrow 910 represents uncertainty in the phase angle $\phi$, which diminishes as $|\alpha|$ increases according to:

$$\Delta\phi = \frac{1}{2|\alpha|}$$

Because the phase uncertainty is inversely proportional to $|\alpha|$, the coherent state becomes better defined as the average number of photons is increased. Directional arrow 912 represents the photon-number uncertainty:

$$\Delta n = |\alpha|$$

The diameter of the uncertainty disk is:

$$\Delta \phi \Delta n = \frac{1}{2}$$

A measurement on the coherent state outputs the coherent signal $\Sigma$, which is represented by projecting the center of the uncertainty disk 906 onto the X-quadrature axis 902.

The angle $\Omega$ is a property of the measurement that can be set equal to zero by the experimentalist, which gives an X-quadrature-expectation value:

$$\langle \alpha | \hat{X} | \alpha \rangle = |\alpha| \cos \phi = K$$

A homodyne detection measurement outputs the X-quadrature-expectation value K as a function of the phase angle $\phi$ and the amplitude $|\alpha|$. The quantity measured is the difference between the numbers of photons arriving at two different photodetectors during a period of time. The homodyne detector measures photon numbers, or photon counts, and the effect is to produce measurements proportional to an electric field quadrature, enabled through the measurement of detector currents.

A probability amplitude associated with homodyne detection of the coherent state is given by a Gaussian function:

$$f(x, \beta) = \frac{1}{(2\pi)^{1/4}} \exp\left(-\frac{(x-2\beta)^2}{4}\right)$$

where $\beta$ is equal to $\alpha \cos \phi$, and x is the value signal output from the homodyne detection.

Figure 10:
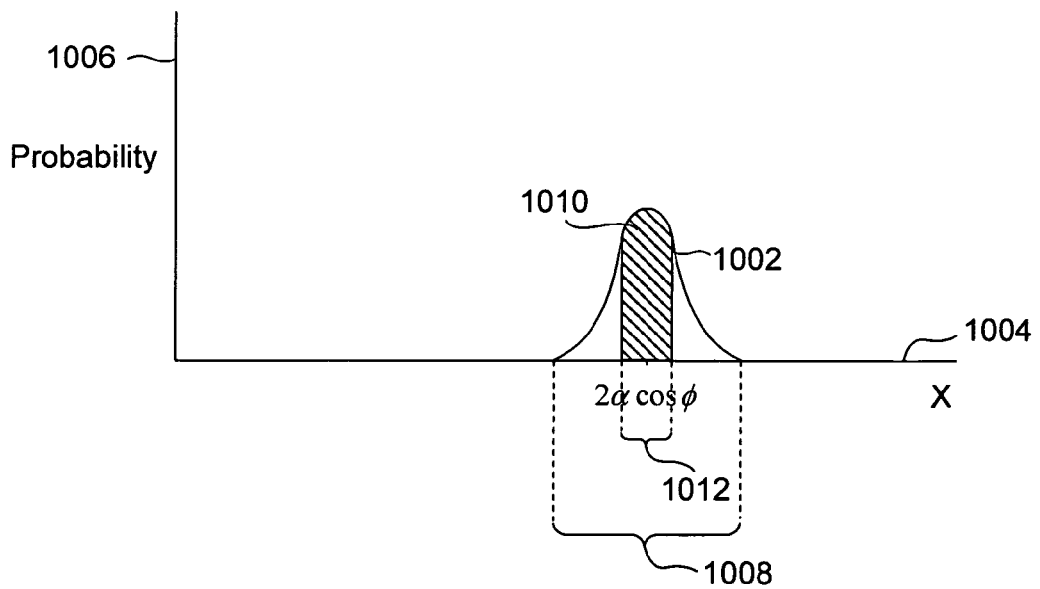
FIG. 10 is a plot of a probability distribution function associated with a coherent state.

Squaring the amplitude f (x,$\beta$) gives the probability distribution of a homodyne measurement. FIG. 10 is a plot of a probability distribution 1002 associated with the coherent state representation shown in FIG. 9. Horizontal axis 1004 corresponds to X quadrature values, and vertical axis 1006 is a probability axis. The probability distribution 1002 is centered about $2\alpha \cos \phi$. A coherent signal output by a homodyne measurement falls within the region 1008. The probability that the coherent signal falls within a particular interval is associated with an area under the probability distribution 1002. For example, hash-marked region 1010 represents the probability that the homodyne detection gives a value in the interval 1012.

An Overview of Quantum Entanglement

A quantum system comprising a first quantum subsystem and a second quantum subsystem has a Hilbert space $H_A \otimes H_B$, where $H_A$ is a Hilbert space associated with the first quantum system, and $H_B$ is a Hilbert space associated with the second quantum system. The kets $|i\rangle_A$ represent the orthonormal eigenstates of the Hilbert space $H_A$, and the kets $|j\rangle_B$ represents the orthonormal eigenstates of the Hilbert space $H_B$, where i and j are positive integers. Any linear superposition of states in the Hilbert space $H_A \otimes H_B$ is given by:

$$|\Psi\rangle_{AB} = \sum_{i,j} c_{ij} |i\rangle_A |j\rangle_B$$

where the amplitudes $c_{ij}$ are complex numbers satisfying the condition:

$$\sum_{ij} |c_{ij}|^2 = 1$$

Special kinds of linear superpositions of states $|\Psi\rangle_{AB}$ are called "direct product states" and are represented by the product:

$$|\Psi\rangle_{AB} = |\psi\rangle_A |\psi\rangle_B = \left(\sum_i c_i^{(A)} |i\rangle_A\right)\left(\sum_j c_j^{(B)} |j\rangle_B\right)$$

where $|\psi\rangle_A$ is a normalized linear superposition of states in the Hilbert space $H_A$, and $|\psi\rangle_B$ is a normalized linear superposition of states in the Hilbert space $H_B$.

However, linear superpositions in the Hilbert space $H_A \otimes H_B$ that cannot be written as a product state are entangled states. In general, for a Hilbert space comprising two or more quantum subsystems, an entangled state is a linear superposition of states that cannot be written as a direct product state. The Bell states $|\psi^-\rangle, |\psi^+\rangle, |\phi^-\rangle,$ and $|\phi^+\rangle$ are examples of entangled states, because the Bell states cannot be factored into products of the qubits $\alpha_1|0\rangle_1 + \beta_1|1\rangle_1$ and $\alpha_2|0\rangle_2 + \beta_2|1\rangle_2$ for any choice of the parameters $\alpha_1, \beta_1, \alpha_2,$ and $\beta_2$.

Embodiments of the Present Invention

Figure 11:
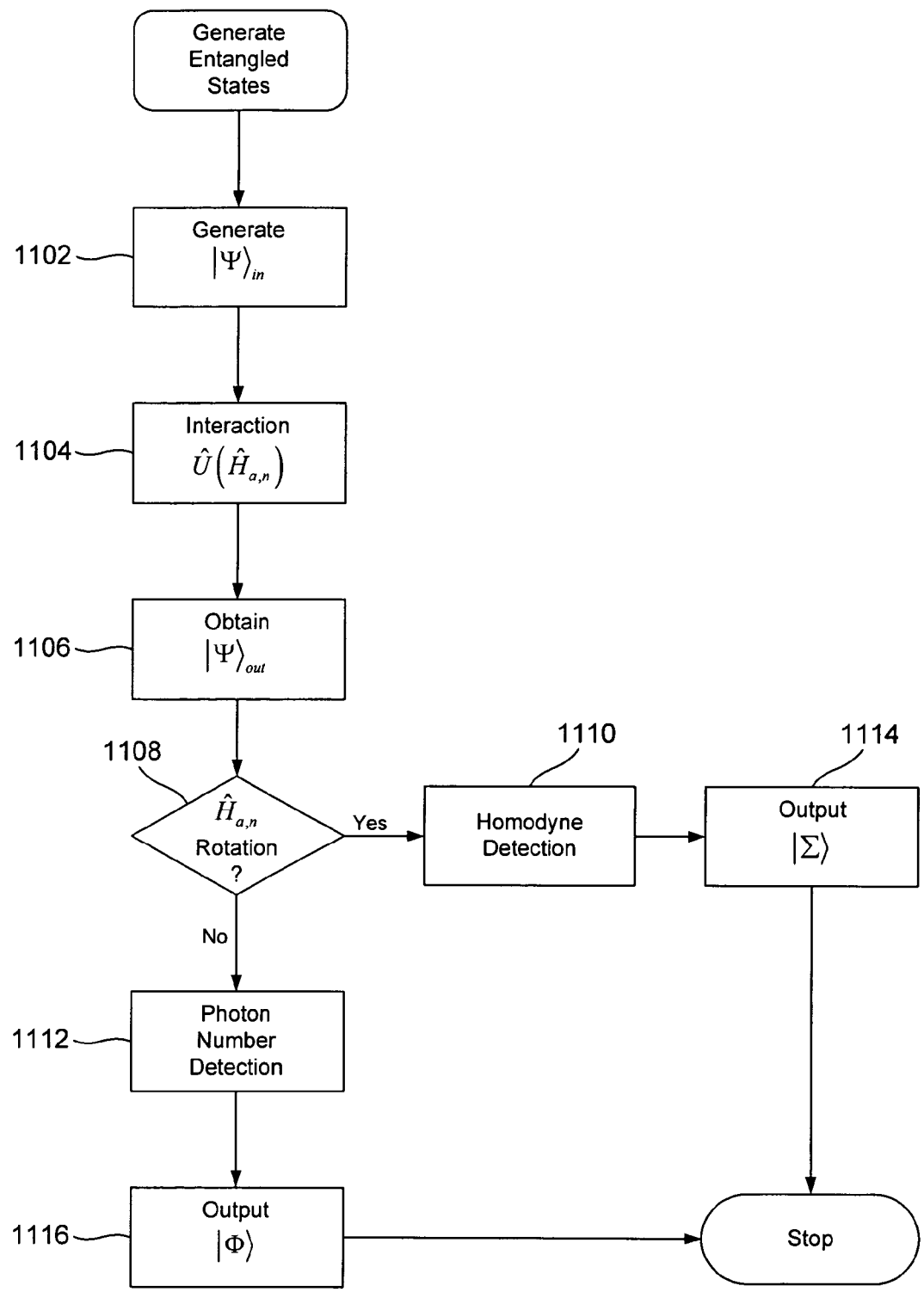
FIG. 11 illustrates a control-flow diagram that describes one of many embodiments of the present invention for generating an entangled state of non-interacting qubits via interaction with a coherent state.

Various embodiments of the present invention are directed to generating entangled states of non-interacting qubits via interaction with a coherent state. FIG. 11 illustrates a control-flow diagram that describes one of many embodiments of the present invention for generating an entangled state of non-interacting qubits. The qubits can be photon-based qubits or matter-based qubits. For example, the basis states $|0\rangle$ and $|1\rangle$ can represent horizontal and vertical polarization states of an electromagnetic field, or the basis states $|0\rangle$ and $|1\rangle$ can represent the spin-up and spin-down states, $|\uparrow\rangle$ and $|\downarrow\rangle$ of an electron. In step 1102, an input state:

$$|\Psi\rangle_{in} = \prod_{n=1}^{N} |\psi\rangle_n |\alpha\rangle_a$$

is generated, where $$|\Psi\rangle_n = \frac{1}{2^{1/2}}(|0\rangle_n + |1\rangle_n)$$

represents a qubit, n is a qubit index, and a identifies the field mode of the probe.

The input state is a tensor product of N non-interacting qubits and a coherent state, which is called a "probe." The input state can be rewritten as a linear superposition of states:

$$|\Psi\rangle_{in} = \frac{1}{2^{N/2}} \sum_{j=1}^{N+1} |\Gamma\rangle_j |\alpha\rangle_a$$

where $$|\Gamma\rangle_j = \sum_{(y_1,\ldots,y_N) \in P_j} |y_1, \ldots, y_N\rangle_j$$

The components $y_n$ of the N-tuple $(y_1, \ldots, y_N)$ are elements of the set $\{0,1\}$ and corresponds to a tensor product $|y_1, \ldots, y_N\rangle$ of the basis states $|0\rangle$ and $|1\rangle$, and $P_j$ is a set of permutations associated with the N-tuple $(y_1, \ldots, y_N)$. The number of N-tuples in the set $P_j$ is equal to the binomial coefficient $$\binom{N}{N_1},$$

where $N_1$ is the number of "1" bits in the N-tuple $(y_1, \ldots y_N)$. For example, the set of permutations associated with the 3-tuple (1,0,0) is $\{(1,0,0),(0,1,0),(0,0,1)\}$. An example of an input state comprising 4 qubits is:

$$|\Psi\rangle_{in} = \frac{1}{2^{4/2}}(|0\rangle_1 + |1\rangle_1)(|0\rangle_2 + |1\rangle_2)(|0\rangle_3 + |1\rangle_3)(|0\rangle_4 + |1\rangle_4)|\alpha\rangle_a$$

which can be rewritten as a linear superposition of states:

$$|\Psi\rangle_{in} = \frac{1}{4} \sum_{j=1}^{5} |\Gamma\rangle_j |\alpha\rangle_a$$

where $|\Gamma\rangle_1 = |0000\rangle_1$ $|\Gamma\rangle_2 = |0000\rangle_2 + |0100\rangle_2 + |0010\rangle_2 + |0001\rangle_2$ $|\Gamma\rangle_3 = |1100\rangle_3 + |1010\rangle_3 + |1001\rangle_3 + |0110\rangle_3 + |0101\rangle_3 + |0011\rangle_3$ $|\Gamma\rangle_4 = |1110\rangle_4 + |1101\rangle_4 + |1011\rangle_4 + |0111\rangle_4$ $|\Gamma\rangle_5 = |1111\rangle_5$ In step 1104, the probe $|\alpha\rangle_a$ is coupled to the product states $|y_1, \ldots, y_N\rangle_j$ and the interaction is characterized by a quantum-mechanical, time-evolution operator:

$$\hat{U} = \prod_{n=1}^{N} \exp\left(\frac{-i\hat{H}_{a,n}t}{\hbar}\right)$$

where $\hat{H}_{a,n}$ is an interaction Hamiltonian that couples the probe $|\alpha\rangle_a$ with the basis states $|y_n\rangle_j$, and t is the interaction time.

The interaction leaves the product states $|y_1, \ldots, y_N\rangle_j$ unchanged. However, the probe experiences a phase shift or a translation represented by $|\alpha_j\rangle_a$, as described below with reference to FIGS. 12A-12B. A phase shift is a change in the phase $\phi$ of the complex number $\alpha$. A translation can be both a change in the average number of photons and a phase shift that is represented in phase space by adding a complex-valued parameter $\gamma_j$ to the parameter $\alpha$. The interaction between a probe and a product state is mathematically represented by:

$$\hat{U}|y_1, \ldots, y_N\rangle_j |\alpha\rangle_a = \sum_{n=1}^{N} \exp\left(\frac{-i\hat{H}_{n,a}t}{\hbar}\right) |y_n\rangle_j |\alpha\rangle_a = |y_1, \ldots, y_N\rangle_j |\alpha_j\rangle_a$$

In step 1106, an output state $|\Psi\rangle_{out}$ is obtained. The output state $|\Psi\rangle_{out}$ is a linear superposition of states resulting from interaction of the probe with the product states of the input state $|\Psi\rangle_{in}$ and is determined mathematically by applying the time-evolution $\hat{U}$ operator to the input state $|\Psi\rangle_{in}$ as follows:

$$|\Psi\rangle_{out} = \hat{U}|\Psi\rangle_{in}$$

$$= \frac{1}{2^{\frac{N}{2}}} \sum_{j=1}^{N+1} \hat{U}|\Gamma\rangle_j |\alpha\rangle_a$$

$$= \frac{1}{2^{\frac{N}{2}}} \sum_{j=1}^{N+1} \sum_{(y_1,\ldots,y_N) \in P_j} \hat{U}|y_1, \ldots, y_N\rangle_j |\alpha\rangle_a$$

$$= \frac{1}{2^{\frac{N}{2}}} \sum_{j=1}^{N+1} \sum_{(y_1,\ldots,y_N) \in P_j} |y_1, \ldots, y_N\rangle_j |\alpha_j\rangle_a$$

$$= \frac{1}{2^{\frac{N}{2}}} \sum_{j=1}^{N+1} |\Gamma\rangle_j |\alpha_j\rangle_a$$

In step 1108, when the interaction results in a phase shift of the probe, the method proceeds to step 1110, otherwise when the interaction result in a translation of the probe, the method proceeds to step 1112. In step 1110, homodyne detection is performed on the probe $|\alpha_j\rangle_a$ using an X quadrature measurement. The X quadrature measurement projects the output state $|\Psi\rangle_{out}$ into an entangled state $|\Sigma\rangle$, which is a linear superposition of two or more states $|\Gamma\rangle_j$. In step 1114, the entangled state $|\Sigma\rangle$ is output. In step 1112, photon number detection is performed on the probe $|\alpha_j\rangle_a$. The measurement projects the output state $|\Psi\rangle_{out}$ into an entangled state $|\Phi\rangle$, which is a linear superposition of two or more states $|\Gamma\rangle_j$. In step 1116, the entangled state $|\Phi\rangle$ is output.

Figure 12A:
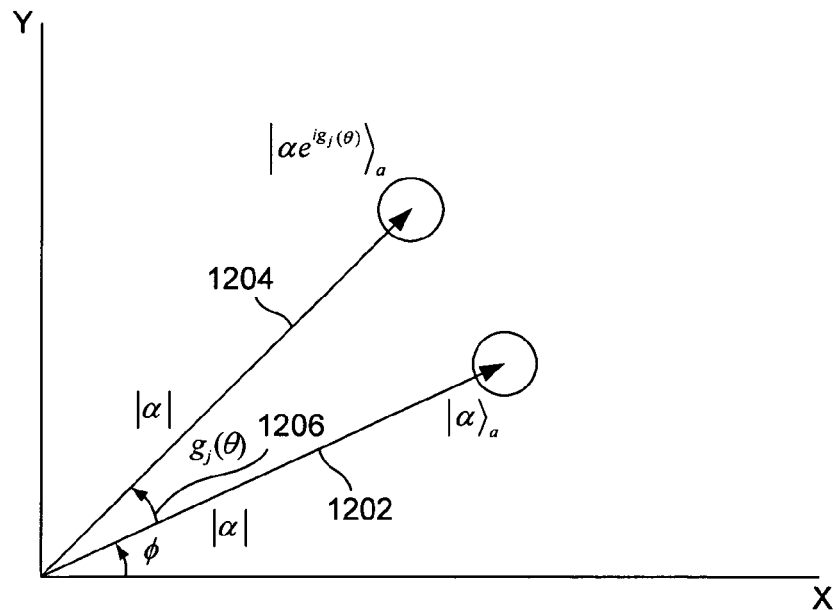
FIGS. 12A-12B are phase-space diagrams that represent a phase shift and a translation of a probe, respectively.
Figure 12B:
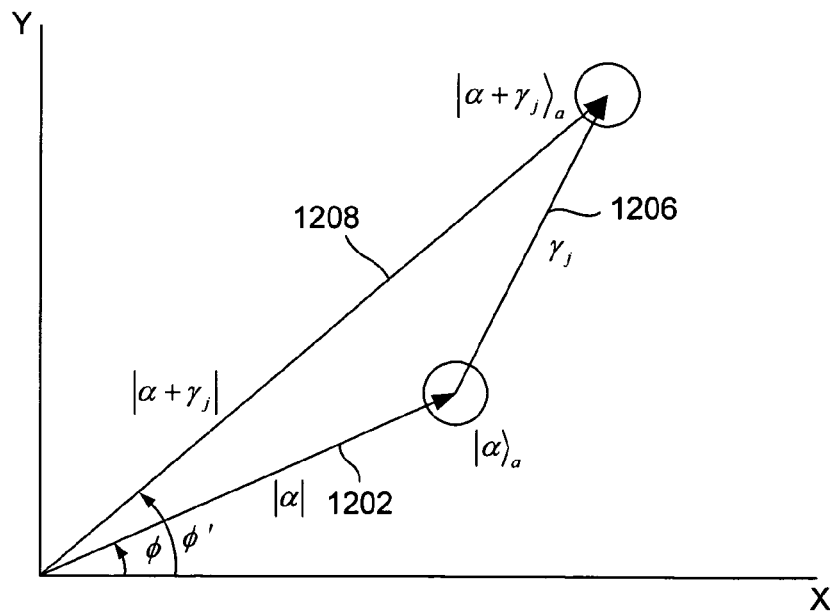

FIGS. 12A-12B are phase-space diagrams that represent a phase shift and a translation of a probe, respectively, as described above with reference to step 1104, in FIG. 11. In FIGS. 12A-12B, each probe is represented in phase space by a vector and an uncertainty disks, as described above with reference to FIG. 9. In FIG. 12A, a phase shift interaction between the probe $|\alpha\rangle_a$ 1202 and the product state $|y_1, \ldots, y_N\rangle_j$ causes a phase shift $g_j(\theta)$ 1206 that results in a phase-shifted probe $|\alpha e^{i g_j(\theta)}\rangle_a$ 1204. The average number of photons $|\alpha|$ associated with the probe $|\alpha\rangle_a$ and with the phase-shifted probe $|\alpha e^{i g_j(\theta)}\rangle_a$ are identical, as represented by the identical length vectors 1202 and 1204. In FIG. 12B, a translation interaction between the probe $|\alpha\rangle_a$ 1202 and the product state $|y_1, \ldots, y_N\rangle_j$ causes a translation $\gamma_j$ 1206 that results in a translated probe $|\alpha + \gamma_N\rangle_j$ 1208. The translated probe $y_N$, 1208 has a phase angle $\phi'$ and average number of photons $|\alpha + \gamma_j|$ that are different from the phase angle $\phi$ and the average number of photons $|\alpha|$ of the probe $|\alpha\rangle_a$ 1202.

The probe $|\alpha\rangle_a$ and a reference coherent state $|\beta\rangle$ are initially prepared with identical average photon numbers and phase angles. After the probe interaction in step 1104, the phase shift or translation is determined by comparing the probe $|\alpha_j\rangle_a$ to the reference coherent state $|\beta\rangle$. The probe $|\alpha\rangle_a$ parameter a can be thought of as initially having a phase angle equal to zero. In other words, $\alpha$ is initially real valued and lies on the X quadrature axis described above with reference to FIG. 9.

Figure 13:
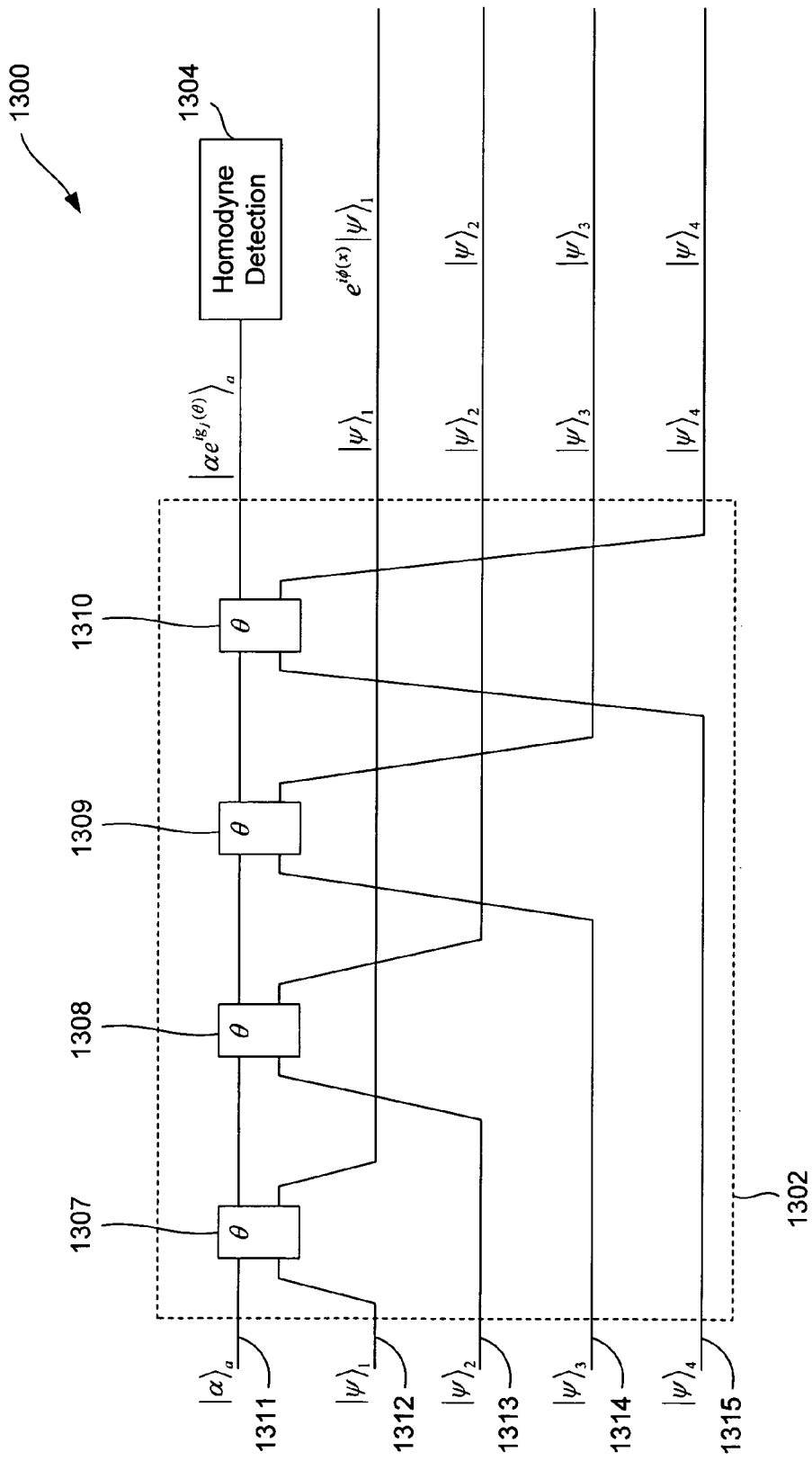
FIG. 13 illustrates a first implementation of the method described in FIG. 11 that represents an embodiment of the present invention.

FIG. 13 illustrates a first implementation 1300 of the method described above with reference to FIG. 11 for the 4-qubit input state $|\Psi\rangle_{in}$ that represents an embodiment of the present invention. The implementation 1300 comprises an interaction region 1302 and homodyne detection 1304. The interaction region 1302 comprises four separate and identical interaction mediums 1307-1310 for interacting basis states of matter-based qubits with the probe. The interactions are characterized by an interaction Hamiltonian:

$$\hat{H}_{a,n}^1 = \hbar\chi \hat{a}^\dagger \hat{a} \hat{\sigma}_{z,n}$$

where $\hat{a}^\dagger \hat{a}$ is the number operator of the probe $|\alpha\rangle_a$ and $\chi$ is a constant that represents the coupling strength between the probe $|\alpha\rangle_a$ and the basis states. The operator $\hat{\sigma}_{z,n} = |0\rangle_{nn}\langle 0| - |1\rangle_{nn}\langle 1|$ is an inversion operator that operates on the basis states as follows:

$$\hat{\sigma}_{z,n}|0\rangle_n = |0\rangle_n \text{ and } \hat{\sigma}_{z,n}|1\rangle_n = -|1\rangle_n$$

The interaction Hamiltonian $\hat{H}_{a,n}^1$ arises from an electric or magnetic dipole interaction between the basis states of a matter-based qubit and the probe $|\alpha\rangle_a$. The transmission channels 1311-1315 transmit the probe $|\alpha\rangle_a$ and the qubits $|\psi\rangle_1, |\psi\rangle_2,$ and $|\psi\rangle_3,$ and $|\psi\rangle_4$ into, and out of, the interaction region 1302. The transmission channels 1311-1315 are separate and prevent the basis states from interacting with one another. The probe $|\alpha\rangle_a$ is transmitted to each of the interaction mediums 1307-1310 and interacts separately with each of the qubits, for a period of time t. The time-evolution operator that characterizes the interaction region 1302 is:

$$\hat{U}_1 = \prod_{n=1}^{4} \exp(-i\theta \hat{a}^\dagger \hat{a} \hat{\sigma}_{z,n})$$

where $\theta$ is the interaction strength and is equal to the product $\chi t$. The state output from the interaction region 1302 is mathematically represented by applying the time-evolution operator $\hat{U}_1$ to the input state $|\Psi\rangle_{in}$:

$$|\Psi\rangle_{out} = \hat{U}_1 |\Psi\rangle_{in}.$$

The basis states $|y_1\rangle_j, |y_2\rangle_j, |y_3\rangle_j,$ and $|y_4\rangle_j$ in each term of $|\Psi\rangle_{in}$ are unchanged by interactions with the probe $|\alpha\rangle_a$. However, the probe $|\alpha\rangle_a$ accumulates a phase shift. For example, the product state $|1000\rangle$ interaction with the probe $|\alpha\rangle_a$ is:

$$\prod_{n=1}^{4} \exp(-i\theta \hat{a}^\dagger \hat{a} \hat{\sigma}_{z,n})|1000\rangle|\alpha\rangle_a =$$

$$\exp(-i\theta \hat{a}^\dagger \hat{a} \hat{\sigma}_{z,1})|1\rangle_1 \otimes \exp(-i\theta \hat{a}^\dagger \hat{a} \hat{\sigma}_{z,2})|0\rangle_2 \otimes \exp(-i\theta \hat{a}^\dagger \hat{a} \hat{\sigma}_{z,3})$$

$$|0\rangle_3 \otimes \exp(-i\theta \hat{a}^\dagger \hat{a} \hat{\sigma}_{z,4})|0\rangle_4 |\alpha\rangle_a = |1000\rangle|\alpha e^{-i2\theta}\rangle_a$$

The interaction region 1302 outputs the linear superposition of states:

$$|\Psi\rangle_{out} = \frac{1}{4}[|\Gamma\rangle_1|\alpha e^{-i4\theta}\rangle_a +$$

$$|\Gamma\rangle_2|\alpha e^{-i2\theta}\rangle_a + |\Gamma\rangle_3|\alpha\rangle_a + |\Gamma\rangle_4|\alpha e^{-i2\theta}\rangle_a + |\Gamma\rangle_5|\alpha e^{-i4\theta}\rangle_a]$$

Figure 14A:
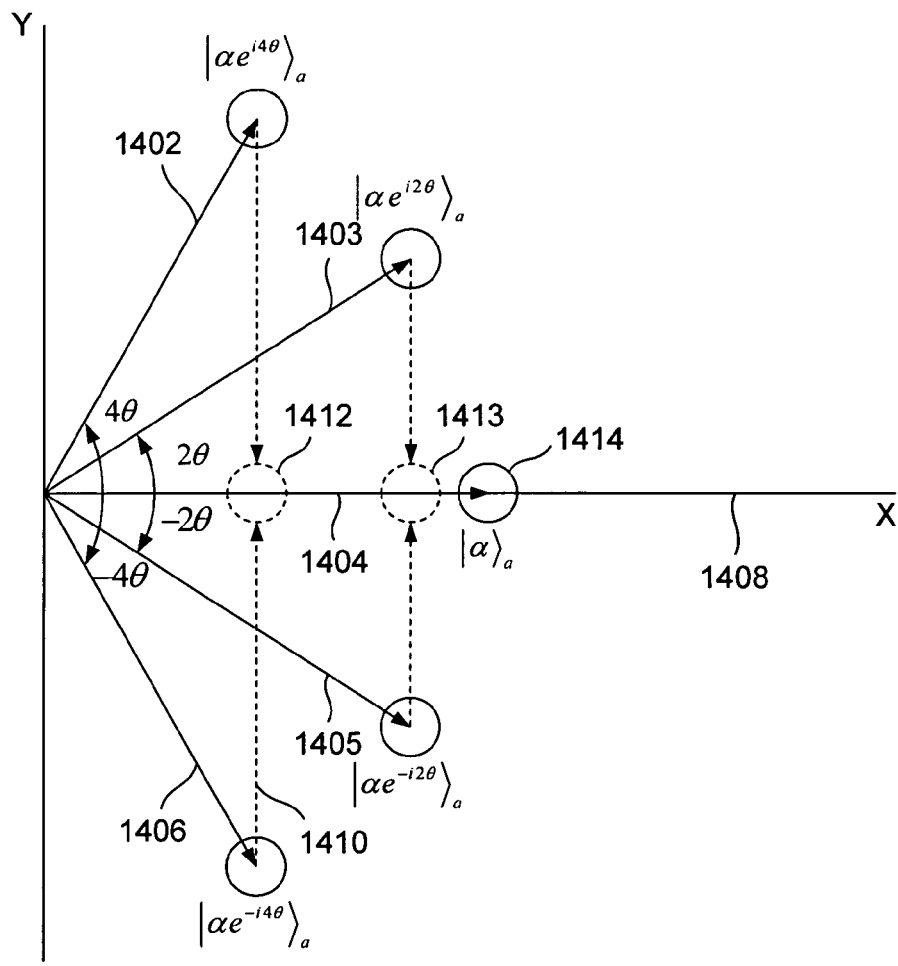
FIG. 14A is a phase-space diagram of probes entangled with basis states output from a probe-basis-state interaction region of the implementation in FIG. 13 that represents an embodiment of the present invention.

FIG. 14A is a phase-space diagram of the probes in the output state $|\Psi\rangle_{out}$ output from the interaction region 1302. In FIG. 14A, the vectors 1402-1406 represent the probes $|\alpha e^{i4\theta}\rangle_a, |\alpha e^{i2\theta}\rangle_a, |\alpha\rangle_a, |\alpha e^{i2\theta}\rangle_a, |\alpha e^{i4\theta}\rangle_a$ respectively. In FIG. 13, the probe is output from the interaction region 1302 and input to the homodyne detection 1304. Operation of the homodyne detection 1304 is represented by projecting the vectors 1402-1406 and the associated uncertainty disks onto the X-quadrature axis 1408, as indicated by dashed-line directional arrows, such as directional arrow 1410. Uncertainty disks 1412-1414 identify ranges of X-quadrature values output from the homodyne detection 1304. An X-quadrature value that falls within one of the three uncertainty disks 1412-1414 reveals an associated entangled state of qubits output from the implementation 1400. For example, a homodyne detection 1304 that outputs an X-quadrature value within the range identified ay the uncertainty disk 1412 reveals the entangled state comprising a linear superposition of the states $|\Gamma\rangle_1$ and $|\Gamma\rangle_5$.

A linear superposition of entangled states output from to the interaction region 1302 and input to the homodyne detection 1304 is:

$$|\Psi\rangle_{out}^{HD} = \frac{2^{\frac{1}{2}} f(x, \alpha\cos 4\theta)}{4}|\Sigma\rangle_1 + \frac{8^{\frac{1}{2}} f(x, \alpha\cos 2\theta)}{4}|\Sigma\rangle_2 + \frac{6^{\frac{1}{2}} f(x, \alpha)}{4}|\Sigma\rangle_3$$

where $$|\Sigma\rangle_1 = \frac{1}{2^{\frac{1}{2}}}(e^{i\phi_1(x)}|0000\rangle + e^{-i\phi_1(x)}|1111\rangle)$$

$$|\Sigma\rangle_2 = \frac{1}{8^{\frac{1}{2}}}[e^{i\phi_2(\theta)}(|1000\rangle + |0100\rangle + |0010\rangle + |0001\rangle) +$$

$$e^{-i\phi_2(\theta)}(|0111\rangle + |1011\rangle + |1101\rangle + |1110\rangle)], \text{ and}$$

$$|\Sigma\rangle_3 = \frac{1}{6^{\frac{1}{2}}}(|1100\rangle + |1010\rangle + |1001\rangle + |0110\rangle + |0101\rangle + |0011\rangle)$$

are normalized entangled states output as a result of the homodyne detection 1304. The homodyne detection 1304 creates phase shifts in the product states of entangled states $|\Sigma\rangle_1$ and $|\Sigma\rangle_2$ where the phases are given by:

$\phi_1(x) = \alpha \sin 4\theta(x - 2\alpha \cos 4\theta) \mod 2\pi$, and $\phi_2(x) = \alpha \sin 2\theta(x - 2\alpha \cos 2\theta) \mod 2\pi$ Note that in FIG. 13, the phase shift created by the homodyne detection 1304 is represented by applying a phase shift $e^{i\phi(x)}$ to the qubit $|n\rangle_j$, where the phase $\phi(x)$ represents either the phase $\phi_1(x)$ or the phase $\phi_2(x)$.

Figure 15A:
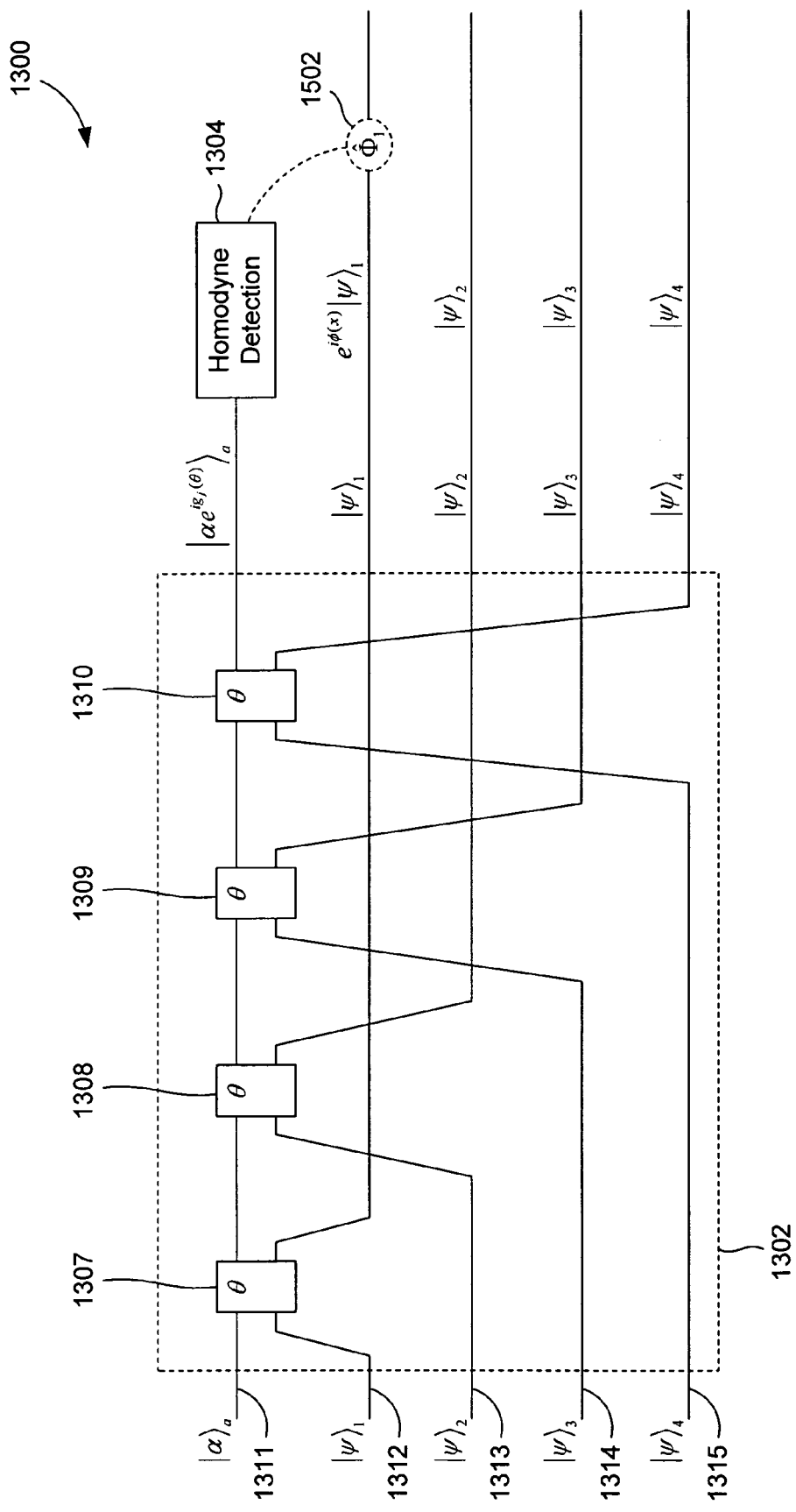
FIGS. 15A-15B illustrate corrections that remove a phase shift from entangled states output from the implementation shown in FIG. 13 and represents an embodiment of the present invention.

The phase shifts in the product states of the entangled states $|\Sigma\rangle_1$ and $|\Sigma\rangle_2$ can be corrected by applying single-qubit phase shift operations that are determined by the homodyne detection 1304 output. FIG. 15A illustrates a correction that removes the phase $\phi_1(x)$ from the entangled states output by the implementation 1300 are represents an embodiment of the present invention. In FIG. 15A, when the homodyne detection 1304 reveals the entangled state $|\Sigma\rangle_1$, the phase shift operation 1502 removes the phase $\phi_1(x)$. The phase shift operation 1502 is mathematically characterized by a phase shift operator:

$\hat{\Phi}_1 = \exp(-i\phi_1(x)\hat{\sigma}_{z,1})$

The phase shift operation 1502 can be equally applied to any of the four qubits, because the final state is invariant under any permutation of the qubit labels. Application of the phase shift operation 1502 is mathematically represented by:

$$\hat{\Phi}_1|\Sigma\rangle_1 = \frac{1}{2^{\frac{1}{2}}}(|0000\rangle + |1111\rangle)\frac{8|f(x, \alpha\cos 2\theta)|^2}{16}, \text{ and } \frac{2|f(x, \alpha\cos 4\theta)|^2}{16}$$

Figure 15B:
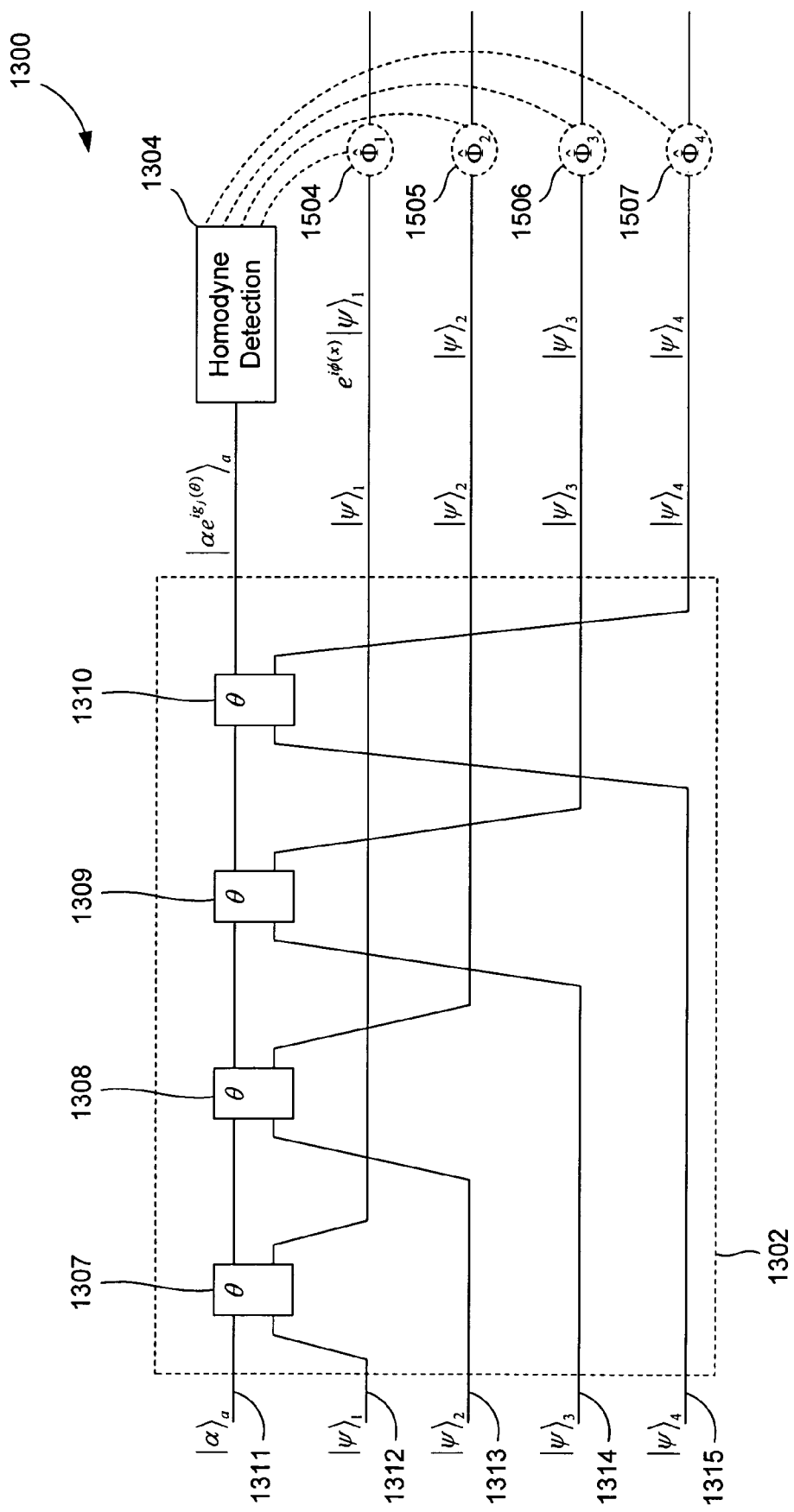

FIG. 15B illustrates a correction that removes the phase $\phi_2(x)$ from the entangled states output by the implementation 1300 are represents an embodiment of the present invention. In FIG. 15B, when the homodyne detection 1306 reveals the entangled state $|\Sigma\rangle_2$, four phase shift operations 1504-1507 remove the phase $\phi_2(x)$. The phase shift operations 1504-1507 are mathematically characterized by a tensor product of phase shift operators:

$\hat{\Phi}_1 \otimes \hat{\Phi}_2 \otimes \hat{\Phi}_3 \otimes \hat{\Phi}_4$ where $$\hat{\Phi}_j = \exp\left(\frac{-i\phi_2(x)\hat{\sigma}_{z,j}}{2}\right)$$

The phase shift operations 1504-1507 break a single qubit operation into an operation that is applied to each of the four qubits. Application of the phase shift operations 1504-1507 is mathematically represented by:

$$\hat{\Phi}_1 \otimes \hat{\Phi}_2 \otimes \hat{\Phi}_3 \otimes \hat{\Phi}_4|\Sigma\rangle_2 = \frac{1}{8^{\frac{1}{2}}}[(|1000\rangle + |0100\rangle + |0010\rangle + |0001\rangle) +$$

$$(|0111\rangle + |1011\rangle + |1101\rangle + |1110\rangle)]$$

Note that no phase shift correction is needed for the state:

$$\left|\sum\right\rangle_3 = \frac{1}{6^{1/2}}(|1100\rangle + |1010\rangle + |1001\rangle + |0110\rangle + |0101\rangle + |0011\rangle)$$

Alternatively, the phases in the final states can be noted and tracked through any system that uses the entangled state.

Figure 14B:
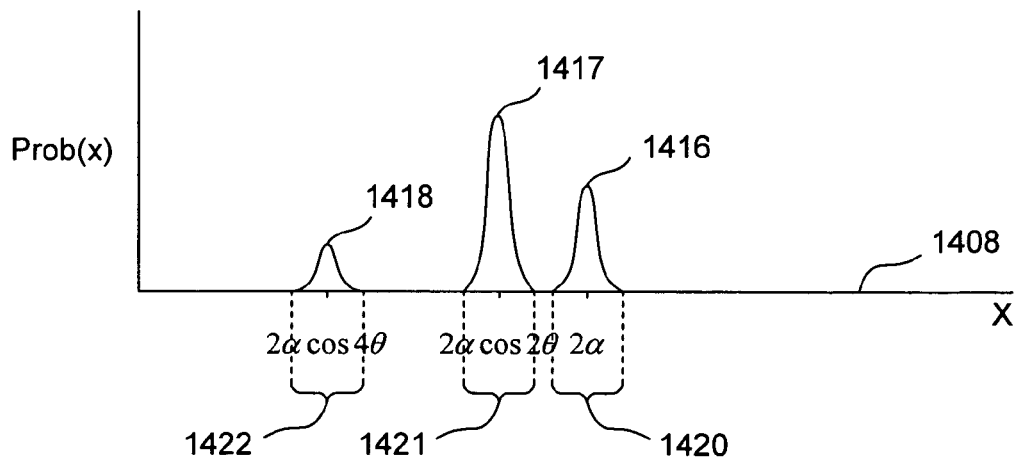
FIG. 14B is a plot of three probability distributions associated with the phase-space diagram in FIG. 13A that represents one of many embodiments of the present invention.

The amplitudes in the output state $|\Psi\rangle_{out}^{HD}$ are functions of the X-quadrature value x, and squaring the amplitudes gives probability distributions that when integrated over the X-quadrature axis reveal the probabilities associated with obtaining the entangled states $|\Sigma\rangle_1$, $|\Sigma\rangle_2$, and $|\Sigma\rangle_3$. FIG. 14B is a plot of three probability distributions versus output values from the homodyne detection 1304 that represents one of many embodiments of the present invention. Curves 1416-1418 represent probability distributions:

$$\frac{6|f(x, \alpha)|^2}{16}$$

respectively, that are obtained by squaring of the amplitudes of the entangled states $|\Sigma\rangle_1$, $|\Sigma\rangle_2$, and $|\Sigma\rangle_3$ in $|\Psi\rangle_{out}^{HD}$. The probability distributions 1416-1418 are centered about the X-quadrature values $2\alpha$, $2\alpha \cos 2\theta$, and $2\alpha \cos 4\theta$, respectively. The regions 1420-1422 correspond to the X-quadrature regions identified by the uncertainty disks 1414, 1413, and 1412, respectively, shown in FIG. 14A. Integrating each of the probability distributions 1416-1418 over the X-quadrature axis 1408 gives the corresponding probability that an X-quadrature value falls within the regions 1420-1422 and of obtaining the entangled states $|\Sigma\rangle_3$, $|\Sigma\rangle_2$, and $|\Sigma\rangle_1$, respectively. The integral values of the probability distributions 1416-1418 indicate that there is ⅜ probability of outputting the entangled state $|\Sigma\rangle_3$, a ½ probability of outputting the entangled state $|\Sigma\rangle_2$, and a ⅛ probability of outputting the entangled state $|\Sigma\rangle_1$, respectively.

Figure 16:
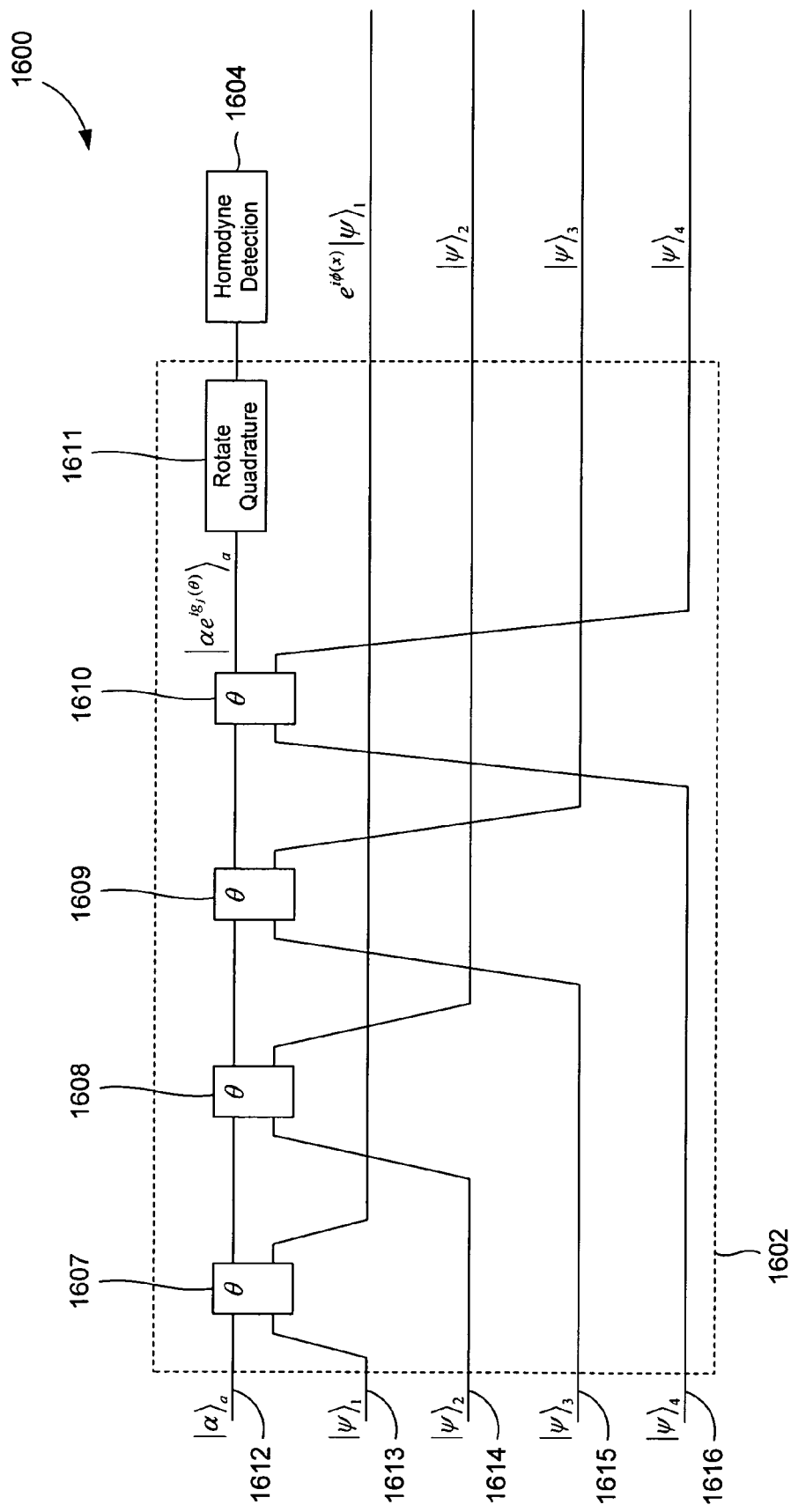
FIG. 16 illustrates a second implementation of the method described to FIG. 11 that represents an embodiment of the present invention.

FIG. 16 illustrates a second implementation 1600 of the method described above with reference to FIG. 11 for the 4-qubit input state $|\Psi\rangle_{in}$ that represents an embodiment of the present invention. The implementation 1600 comprises an interaction region 1602 and homodyne detection 1604. The interaction region 1602 comprises four separate and identical cross-Kerr interaction mediums 1607-1610 for interacting basis states of photon-based qubits with the probe and a rotate quadrature operation 1611. The cross-Kerr interaction mediums are characterized by an interaction Hamiltonian:

$$\hat{H}_{a,n}^2 = \hbar \chi \hat{a}^\dagger \hat{a} (\hat{b}^\dagger \hat{b})_n \qquad 5$$

where $(\hat{b}^\dagger \hat{b})$ is a number operator that operates on the photon basis states as follows:

$$(\hat{b}^\dagger \hat{b})_n |0\rangle_n = 0, \text{ and } (\hat{b}^\dagger \hat{b})_n |1\rangle_n = 1 \cdot |1\rangle_n$$

The transmission channels 1612-1616 separately transmit the probe $|\alpha\rangle_a$ and the photon qubits $|\psi\rangle_1, |\psi\rangle_2, |\psi\rangle_3$, and $|\psi\rangle_4$ into, and out of, the interaction region 1602. The transmission channels can be optical fibers that prevent the states from interacting. The probe $|\alpha\rangle_a$ is transmitted to each of the Kerr interaction mediums 1607-1610 and interacts separately with each of the qubits, for a period of time t. The time-evolution operator characterizing the interactions is:

$$\hat{U}_2 = \prod_{n=1}^{4} \exp\left(-i\theta \hat{a}^\dagger \hat{a} (\hat{b}^\dagger \hat{b})_n\right)$$

Applying the time-evolution operator $\hat{U}_2$ to the input state $|\Psi\rangle_{in}$ represents operation of the interaction mediums 1607-1610 and gives an output state comprising a linear superposition of states:

$$|\Psi\rangle_{out} = \frac{1}{4} [|\Gamma\rangle_1 |\alpha\rangle_a + |\Gamma\rangle_2 |\alpha e^{-i\theta}\rangle_a + |\Gamma\rangle_3 |\alpha e^{-i2\theta}\rangle_a + |\Gamma\rangle_4 |\alpha e^{-i3\theta}\rangle_a + |\Gamma\rangle_5 |\alpha e^{-i4\theta}\rangle_a]$$

Figure 17A:
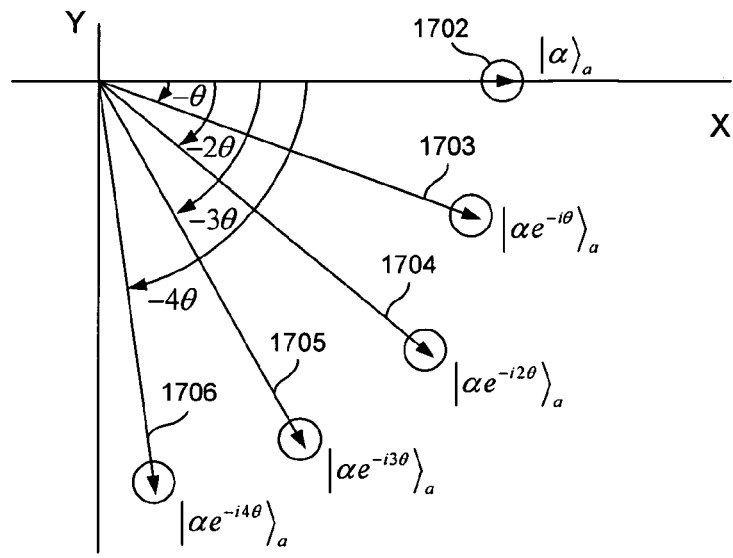
FIG. 17A is a phase-space diagram of probes entangled with basis states output from a probe-basis-state interaction region of the implementation in FIG. 15 that represents an embodiment of the present invention.

FIG. 17A is a phase-space diagram of the probes in the output state $|\Psi\rangle_{out}$ output from the interaction region 1602. In FIG. 17A, the vectors 1702-1706 represent to probes $|\alpha\rangle_a, |\alpha e^{-i\theta}\rangle_a, |\alpha e^{-i2\theta}\rangle_a, |\alpha e^{-i3\theta}\rangle_a$, and $|\alpha e^{-i4\theta}\rangle_a$, respectively. In order to prepare the output state $|\Psi\rangle_{out}$ for homodyne detection 1604, the rotate quadrature operation 1611 adjusts the phase of the probe. The rotate quadrature operation 1611 is characterized by the rotation operator $\exp(i2\theta \hat{a}^\dagger \hat{a})$ and applying the rotation operator to the output state $|\Psi\rangle_{out}$ gives:

$$|\Psi\rangle_{out}^{rot} = \frac{1}{4} [|\Gamma\rangle_1 |\alpha e^{i2\theta}\rangle_a + |\Gamma\rangle_2 |\alpha e^{i\theta}\rangle_a + |\Gamma\rangle_3 |\alpha\rangle_a + |\Gamma\rangle_4 |\alpha e^{-i\theta}\rangle_a + |\Gamma\rangle_5 |\alpha e^{-i2\theta}\rangle_a]$$

Figure 17B:
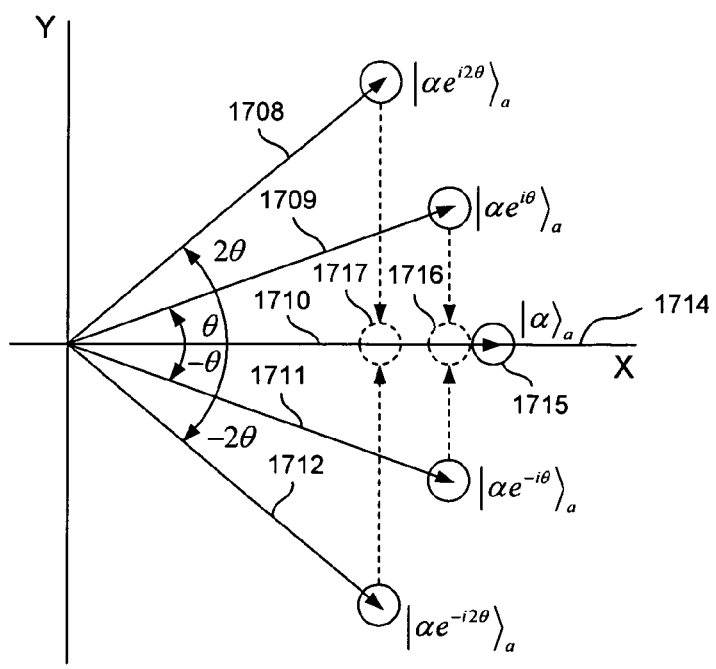
FIG. 17B is a phase-space diagram of rotated probes entangled with basis states output from a probe-basis-state interaction region of the implementation in FIG. 15 that represents an embodiment of the present invention.

FIG. 17B is a phase-space diagram of the output state $|\Psi\rangle_{out}^{rot}$. In FIG. 17B, the vectors 1708-1712 represent rotated probes $|\alpha e^{i2\theta}\rangle_a, |\alpha e^{i\theta}\rangle_a, |\alpha\rangle_a, |\alpha e^{-i\theta}\rangle_a$, and $|\alpha e^{-i2\theta}\rangle_a$, respectively. The homodyne detection 1604 projects the uncertainty disks associated with the probes onto the X-quadrature axis 1714, as indicated by dashed-line directional arrows. An X-quadrature value output from the homodyne detection 1604 falls within one of the ranges identified by three uncertainty disks 1715-1717 and reveals the entangled state of qubits output from the implementation 1600. For example, a homodyne detection 1604 that outputs an X-quadrature value within the range of values identified by the uncertainty disk 1716 results in an entangled state comprising a linear superposition of the states $|\Gamma\rangle_2$ and $|\Gamma\rangle_4$.

A linear superposition of entangled states input to the homodyne detection 1604 is:

$$|\Psi\rangle_{out}^{HD} = \frac{2^{1/2} f(x, \alpha\cos 2\theta)}{4} |\Sigma\rangle_1 + \frac{8^{1/2} f(x, \alpha\cos\theta)}{4} |\Sigma\rangle_2 + \frac{6^{1/2} f(x, \alpha)}{4} |\Sigma\rangle_3$$

where $$|\Sigma\rangle_1 = \frac{1}{2^{1/2}} (e^{i\phi_1(x)}|0000\rangle + e^{-i\phi_1(x)}|1111\rangle)$$

$$|\Sigma\rangle_2 = \frac{1}{8^{1/2}} [e^{i\phi_2(\theta)}(|1000\rangle + |0100\rangle + |0010\rangle + |0001\rangle) + e^{-i\phi_2(\theta)}(|0111\rangle + |1011\rangle + |1101\rangle + |1110\rangle)], \text{ and}$$

$$|\Sigma\rangle_3 = \frac{1}{6^{1/2}} (|1100\rangle + |1010\rangle + |1001\rangle + |0110\rangle + |0101\rangle + |0011\rangle)$$

are normalized entangled states. The homodyne detection 1604 creates phase shifts in the product states of $|\Sigma\rangle_1$ and $|\Sigma\rangle_2$ where the phases are given by:

$$\phi_1(x) = \alpha \sin 2\theta (x - 2\alpha \cos 2\theta) \mod 2\pi, \text{ and}$$

$$\phi_2(x) = \alpha \sin \theta (x - 2\alpha \cos \theta) \mod 2\pi$$

Figure 18A:
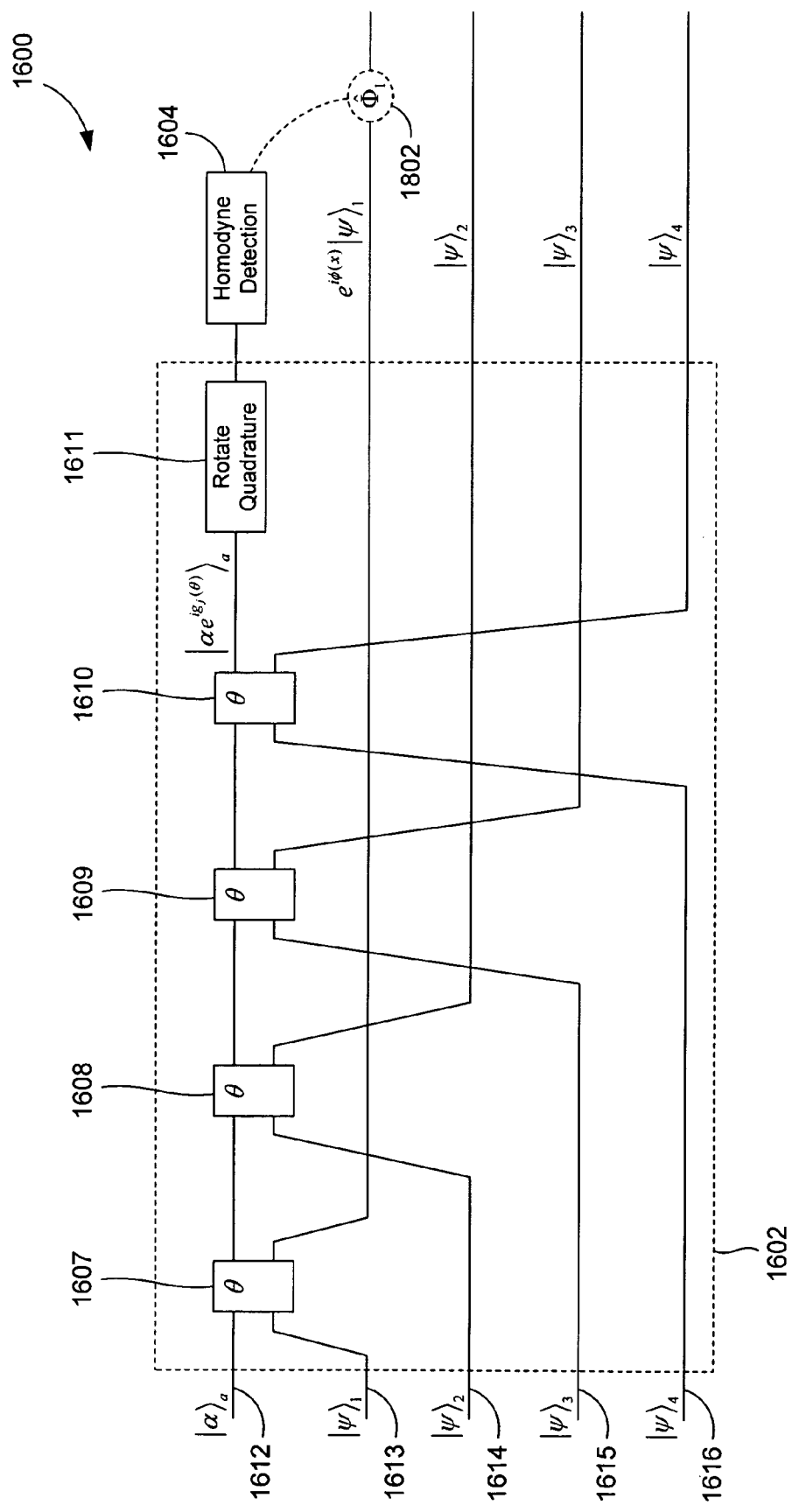
FIGS. 18A-18B illustrate corrections that remove a phase shift from entangled states output from the implementation shown in FIG. 16 and represents an embodiment of the present invention.

The phase shifts in the product states of the entangled states $|\Sigma\rangle_1$ and $|\Sigma\rangle_2$ can be corrected by applying single-qubit phase shift operations that are determined by the homodyne detection 1604 output. FIG. 18A illustrates a correction that removes the phase $\phi_1(x)$ from the entangled state $|\Sigma\rangle_1$ output by the implementation 1600 and represents an embodiment of the present invention. In FIG. 16A, when the homodyne detection 1604 reveals the entangled state $|\Sigma\rangle_1$, the phase shift operation 1802 removes the phase $\phi_1(x)$. The phase shift operation 1802 is mathematically characterized by a phase shift operator:

$$\hat{\Phi}_1 = \exp(-i\phi_1(x)\hat{\sigma}_{z,1})$$

The phase shift operation 1802 can be equally applied to any of the four qubits, because the final state is invariant under any permutation of the qubit labels. Application of the phase shift operation 1802 is mathematically represented by:

$$\hat{\Phi}_1 |\Sigma\rangle_1 = \frac{1}{2^{1/2}} (|0000\rangle + |1111\rangle)$$

Figure 18B:
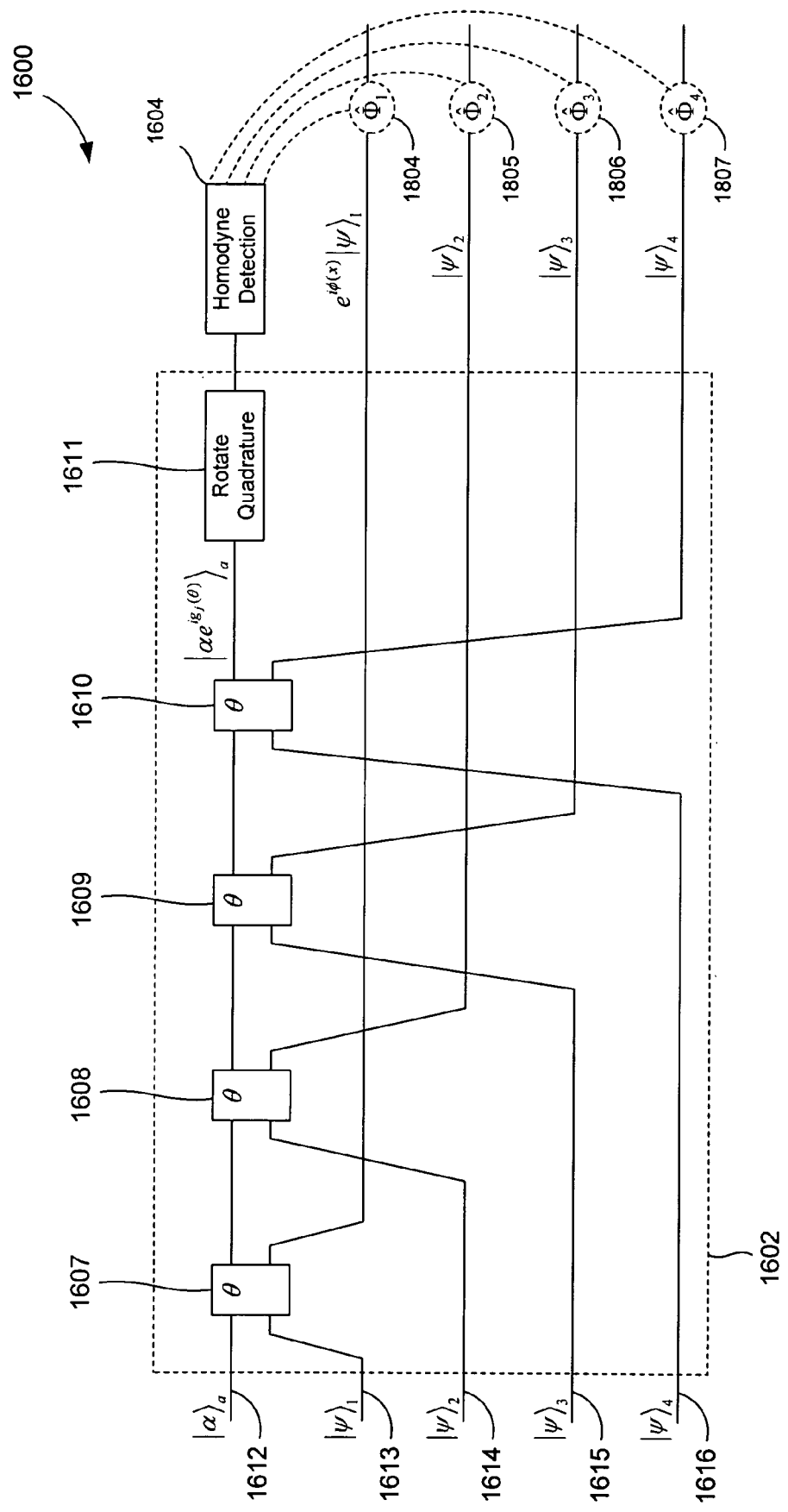

FIG. 18B illustrates a correction that removes the phase $\phi_2(x)$ from the entangled states output by the implementation 1600 and represents an embodiment of the present invention. In FIG. 18B, when the homodyne detection 1604 reveals the entangled state $|\Sigma\rangle_2$, four phase shift operations 1804-1807 remove the phase $\phi_2(x)$. The phase shift operations 1804-1807 are mathematically characterized by a tensor product of phase shift operators:

$$\hat{\Phi}_1 \otimes \hat{\Phi}_2 \otimes \hat{\Phi}_3 \otimes \hat{\Phi}_4$$

where $$\hat{\Phi}_j = \exp\left(\frac{-i\phi_2(x)\hat{\sigma}_{z,j}}{2}\right)$$

The phase shift operations 1804-1807 break a single qubit operation into an operation that is applied to each of the four qubits. Application of the phase shift operations 1804-1807 is mathematically represented by:

$$\hat{\Phi}_1 \otimes \hat{\Phi}_2 \otimes \hat{\Phi}_3 \otimes \hat{\Phi}_4 |\Sigma\rangle_2 = \frac{1}{8^{1/2}}[(|1000\rangle + |0100\rangle + |0010\rangle + |0001\rangle) + (|0111\rangle + |1011\rangle + |1101\rangle + |1110\rangle)]$$

Note that no phase shift correction is needed for the entangled state:

$$|\Sigma\rangle_3 = \frac{1}{6^{1/2}}(|1100\rangle + |1010\rangle + |1001\rangle + |0110\rangle + |0101\rangle + |0011\rangle)$$

Alternatively, the phases in the final states can be noted and tracked through any system that uses the entangled state.

Figure 17C:
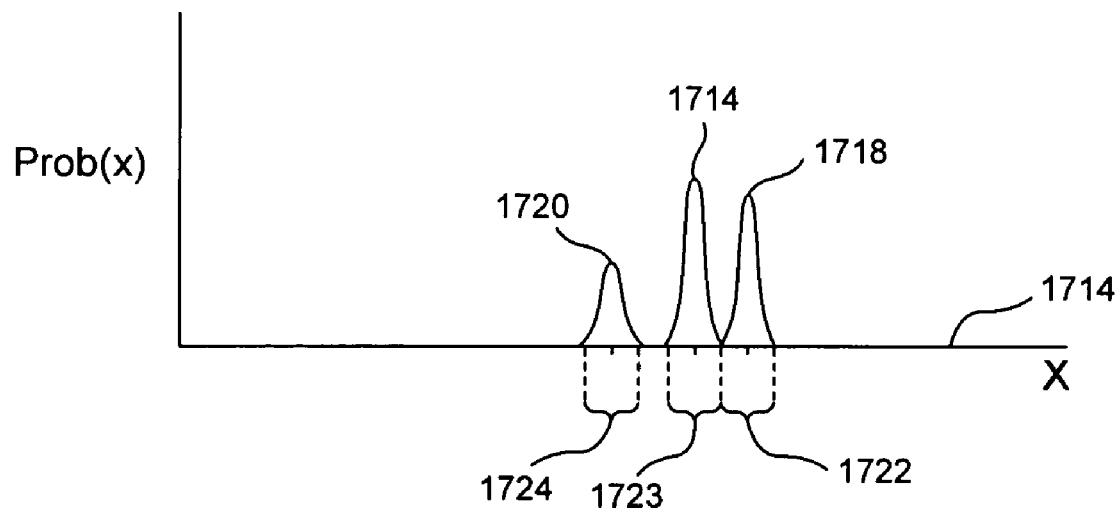
FIG. 17C is a plot of three probability distributions associated with the phase-space diagram of the output state in FIG. 17B that represents one of many embodiments of the present invention.

FIG. 17C is a plot of three probability distributions versus output values from the homodyne detection 1604 that represents one of many embodiments of the present invention. Curves 1718-1720 are probability distributions that are obtained by squaring the amplitudes of the entangled states $|\Sigma\rangle_1$, $|\Sigma\rangle_2$, and $|\Sigma\rangle_3$ in $|\Psi\rangle_{out}^{HD}$ and are centered about the X-quadrature values $2\alpha$, $2\alpha \cos 2\theta$, and $2\alpha \cos 4\theta$, respectively. The regions 1722-1724 correspond to the X-quadrature regions identified by the uncertainty disks 1715-1717, respectively, shown in FIG. 17C. Integrating each of the probability distributions 1718-1720 over the X-quadrature axis 1714 gives the corresponding probability of an X-quadrature value falling within one of the regions 1722-1724 and of obtaining one of the entangled states $|\Sigma\rangle_3$, $|\Sigma\rangle_2$, and $|\Sigma\rangle_1$, respectively. The integral values of the probability distributions 1718-1720 indicates that there is ⅜ probability of outputting the entangled state $|\Sigma\rangle_3$, a ½ probability of outputting the entangled state $|\Sigma\rangle_2$, and a ⅛ probability of outputting the entangled state $|\Sigma\rangle_1$.

Figure 19:
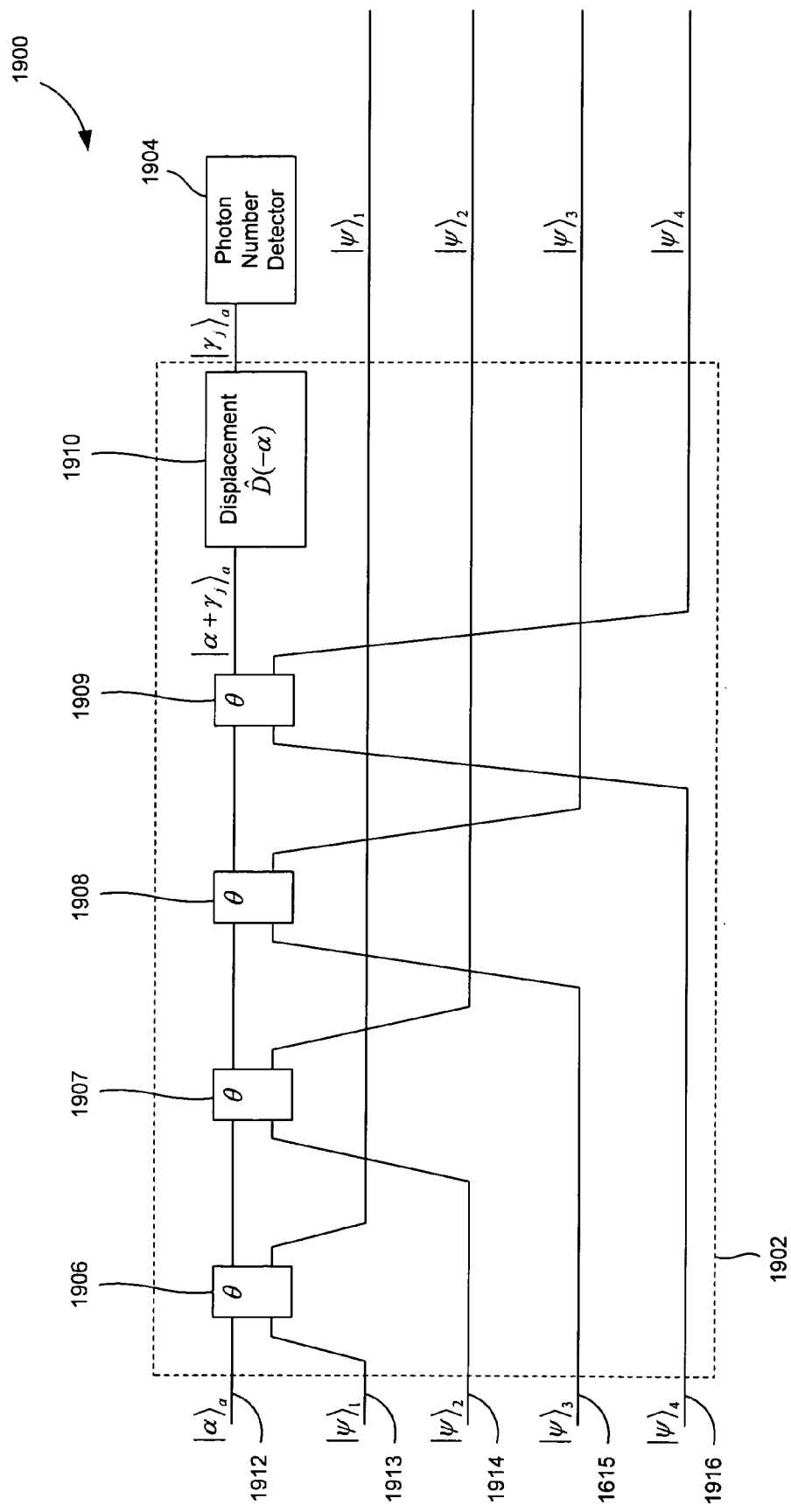
FIG. 19 illustrates a third implementation of the method described to FIG. 11 that represents an embodiment of the present invention.

FIG. 19 illustrates a third implementation 1900 of the method described above with reference to FIG. 11 for the 4-qubit input state $|\Psi\rangle_{in}$ that represents an embodiment of the present invention. The implementation 1900 comprises an interaction region 1902 and a photon number detector 1904. The interaction region 1902 comprises four separate and identical interaction mediums 1906-1909 and a displacement operation 1910. The interaction mediums are characterized by an interaction Hamiltonian:

$$\hat{H}_{a,n}^{\phi} = \hbar\chi\hat{\sigma}_{z,n}(\hat{a}^{\dagger}e^{i\phi} + \hat{a}e^{-i\phi})$$

where $\hat{a}^{\dagger}e^{i\phi} + \hat{a}e^{-i\phi}$ is a quadrature operator of the probe and is determined by the angle $\phi$. When $\phi$ equals $-\pi/2$, the quadrature operator is the Y-quadrature operator, and when $\phi$ equals 0, the quadrature operator is the X-quadrature operator. The interaction Hamiltonian $\hat{H}_{a,n}^{\phi}$ represents a dipole coupling of a matter-based qubit with the probe. The transmission channels 1912-1916 transmit the probe $|\alpha\rangle_a$ and the qubits $|\psi\rangle_1$, $|\psi\rangle_2$, $|\psi\rangle_3$, and $|\psi\rangle_4$ into, and out of, the interaction region 1902. The probe $|\alpha\rangle_a$ is transmitted to each of the interaction mediums 1906-1909 and interacts separately with each of the qubits, for a period of time t. Interactions in the interaction region 1902 are characterized by the time-evolution operator:

$$\hat{U}_\varphi = \prod_{n=1}^{4} \exp\left(\frac{-i\hat{H}_{a,n}^{\varphi}t}{\hbar}\right)$$

$$= \prod_{n=1}^{4} \hat{D}(\hat{\sigma}_{z,n}\gamma(\varphi))$$

where $\hat{D}(\hat{\sigma}_{z,n}\gamma(\phi)) = \exp(\hat{\sigma}_{z,n}\gamma(\phi)\hat{a}^{\dagger} - \hat{\sigma}_{z,n}\gamma^*(\phi)\hat{a})$ is called the "displacement operator," and $\gamma(\phi) = \theta e^{i(\phi - \pi/2)}$.

In an embodiment of the present invention, the angle $\phi$ is equal to $-\pi/2$. Applying the time-evolution operator $\hat{U}_{-\pi/2}$ to the input state $|\Psi\rangle_{in}$ represents the operation performed by the interaction region 1902 and gives an output state comprising a linear superposition of states:

$$|\Psi\rangle_{out} = \hat{U}_{-\pi/2}|\Psi\rangle_{in}$$

$$= \frac{1}{4}[|\Gamma\rangle_1|\alpha + 4\theta\rangle_a + |\Gamma\rangle_2|\alpha + 2\theta\rangle_a + |\Gamma\rangle_3|\alpha\rangle_a + |\Gamma\rangle_4|\alpha - 2\theta\rangle_a + |\Gamma\rangle_5|\alpha - 4\theta\rangle_a]$$

Figure 20A:
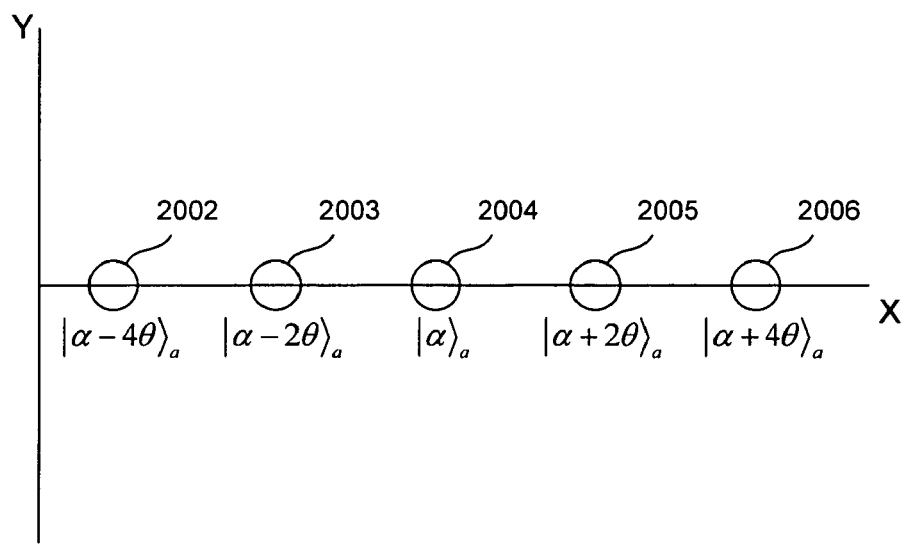
FIG. 20A is a phase-space diagram of probes entangled with basis states output from a probe-basis-state interaction region of the implementation in FIG. 19 that represents an embodiment of the present invention.

FIG. 20A is a phase-space diagram of the output state $|\Psi\rangle_{out}$. In FIG. 20A, the uncertainty disks 2002-2006 located along the X-quadrature axis correspond to the probes $|\alpha - 4\theta\rangle_a$, $|\alpha - 2\theta\rangle_a$, $|\alpha\rangle_a$, $|\alpha + 2\theta\rangle_a$, and $|\alpha + 4\theta\rangle_a$, respectively. The probes are each located at a different distance from the origin, which indicates that each of the probes corresponds to a different number of photons.

The states $|\Gamma\rangle_1$ and $|\Gamma\rangle_5$ in the output state $|\Psi\rangle_{out}$ are not entangled states. In order to project onto a linear superposition of the states $|\Gamma\rangle_1$ and $|\Gamma\rangle_5$ the value of a in the probes states of the output state $|\Psi\rangle_{out}$ is set to zero. In FIG. 19, the displacement operation 1910 is applied to the probe in order to remove the average number of photons associated with the parameter $\alpha$. The displacement operation 1910 is mathematically represented by the displacement operator:

$$\hat{D}(-\alpha) = \hat{D}^*(\alpha) = \exp(-\alpha\hat{a} + \alpha^*\hat{a})$$

Applying the displacement operator $\hat{D}(-\alpha)$ to the output state $|\Psi\rangle_{out}$ gives a phase adjusted output state as follows:

$$|\Psi\rangle_{out}^{adj} = \hat{D}(-\alpha)|\Psi\rangle_{out}$$

$$= \frac{1}{4}[|\Gamma\rangle_1\hat{D}(-\alpha)|\alpha + 4\theta\rangle_a + |\Gamma\rangle_2\hat{D}(-\alpha)|\alpha + 2\theta\rangle_a + |\Gamma\rangle_3\hat{D}(-\alpha)|\alpha\rangle_a + |\Gamma\rangle_4\hat{D}(-\alpha)|\alpha - 2\theta\rangle_a + |\Gamma\rangle_5\hat{D}(-\alpha)|\alpha - 4\theta\rangle_a]$$

$$= \frac{1}{4}[|\Gamma\rangle_1|4\theta\rangle_a + |\Gamma\rangle_2|2\theta\rangle_a + |\Gamma\rangle_3|0\rangle_a + |\Gamma\rangle_4|-2\theta\rangle_a + |\Gamma\rangle_5|-4\theta\rangle_a]$$

Figure 20B:
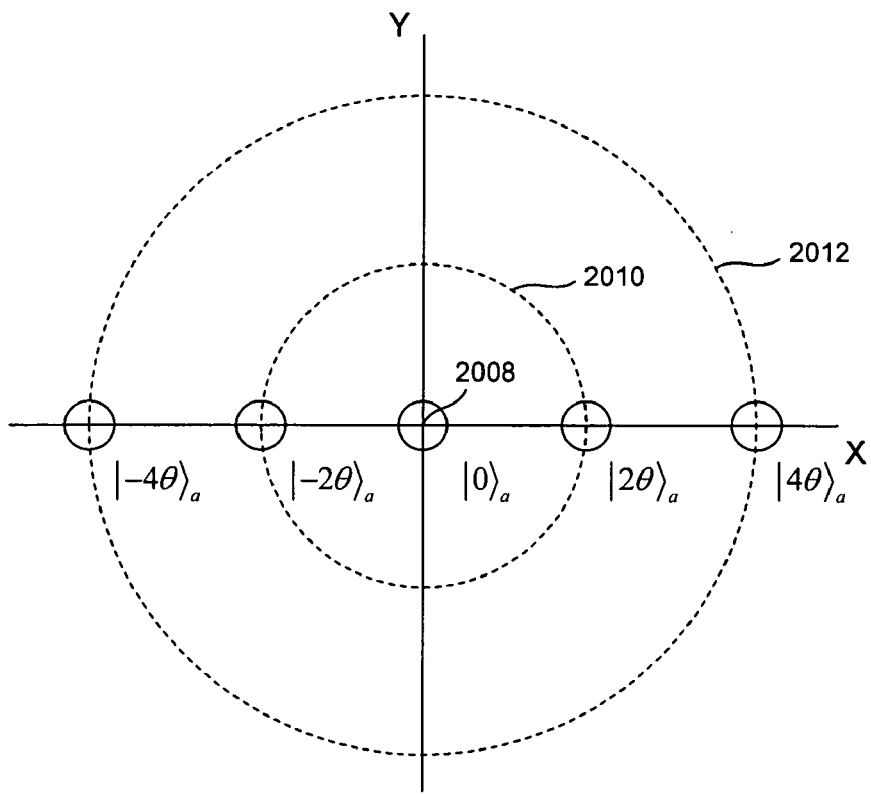
FIG. 20B is a phase-space diagram of the probes in FIG. 20A after application of a translation operation that represents one of many embodiments of the present invention.

FIG. 20B is a phase-space diagram of the phase-adjusted output state $|\Psi\rangle_{out}^{adj}$. As a result of the displacement operation 1910, the probe $|\alpha\rangle_a$ is translated to the vacuum state $|0\rangle_a$ and is located at the origin 2008. The probes $|\alpha+2\theta\rangle$ and $|\alpha-2\theta\rangle$, in FIG. 20A, are translated to $|2\theta\rangle$ and $|-2\theta\rangle$, respectively, which are at identical distances from the origin and have identical numbers of photons as indicated by circle 2010. The probes $|\alpha+4\theta\rangle$ and $|\alpha-4\theta\rangle$, in FIG. 20A, are translated to $|4\theta\rangle$ and $|-4\theta\rangle$, which are also at identical distances from the origin and have identical numbers of photons as indicated by circle 2012.

In FIG. 19, photon number detector 1904 is used to determine the number of photons in the probe, and, as a result, the phase-adjusted output state $|\Psi\rangle_{out}^{adj}$ is projected into one of the number states represented in FIG. 20B. The photon number detector 1904 projects the phase adjusted output state $|\Psi\rangle_{out}^{adj}$ into:

$$|\Psi\rangle_{out}^{PNC} = \frac{1}{2^{3/2}}|\Phi\rangle_1 + \frac{1}{2^{1/2}}|\Phi\rangle_2 + \left(\frac{3}{2}\right)^{1/2}|\Phi\rangle_3$$

where $$|\Phi\rangle_1 = \frac{1}{2^{1/2}}(|0000\rangle + (-1)^m|1111\rangle)$$

$$|\Phi\rangle_2 = \frac{1}{8^{1/2}}[|1000\rangle + |0100\rangle + |0010\rangle + |0001\rangle + (-1)^m(|1110\rangle + |1101\rangle + |1011\rangle + |0111\rangle)]$$

$$|\Phi\rangle_3 = \frac{1}{6^{1/2}}(|1100\rangle + |1010\rangle + |1001\rangle + |0110\rangle + |0101\rangle + |0011\rangle)$$

are the normalized entangled states, and m is the number of photons measured.

Figure 21A:
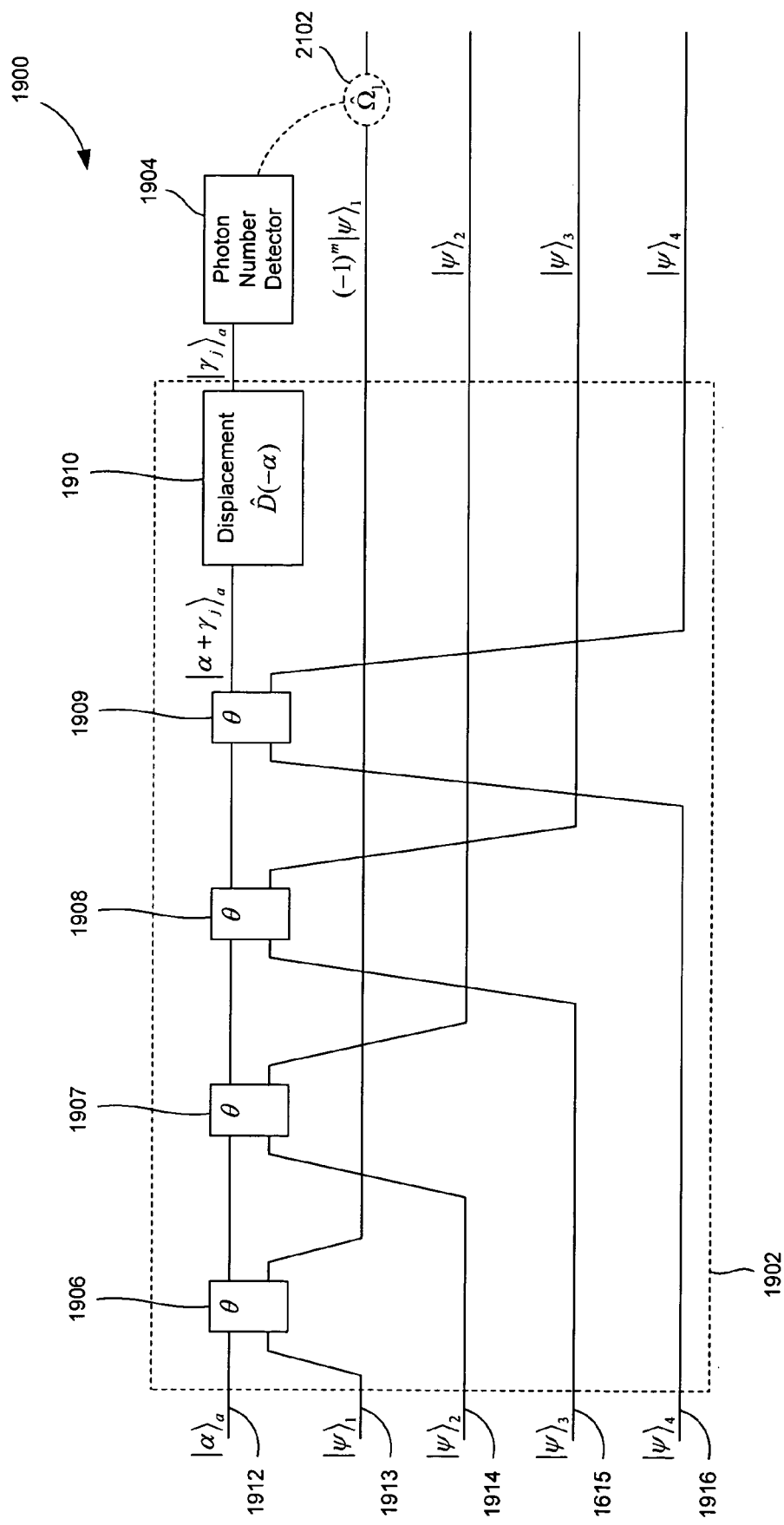
FIGS. 21A-21B illustrate corrections that remove a phase shift from entangled states output from the implementation shown in FIG. 19 and represents an embodiment of the present invention.

The phase shift $(-1)^m$ in the entangled states $|\Phi\rangle_1$ and $|\Phi\rangle_2$ can be corrected by applying single-qubit phase shift operations. FIG. 21A illustrates a correction that removes the phase $(-1)^m$ from the entangled state $|\Phi\rangle_1$ output by the implementation 1900 and represents an embodiment of the present invention. In FIG. 21A, when the photon number detector 1904 reveals the state $|\Phi\rangle_1$, the phase shift operation 2102 removes the phase $(-1)^m$. The phase shift operation 2102 is mathematically characterized by a phase shift operator:

$$\hat{\Omega}_1 = \exp\left(\frac{-im\pi}{2}\right)\exp\left(\frac{im\pi\hat{\sigma}_{z,1}}{2}\right)$$

The phase shift operation 2102 can be equally applied to any of the four qubits, because the final state is invariant under any permutation of the qubit labels. Application of the phase shift operation 2102 is mathematically represented by:

$$\hat{\Omega}_1|\Phi\rangle_1 = \frac{1}{2^{1/2}}(|0000\rangle + |1111\rangle)$$

Figure 21B:
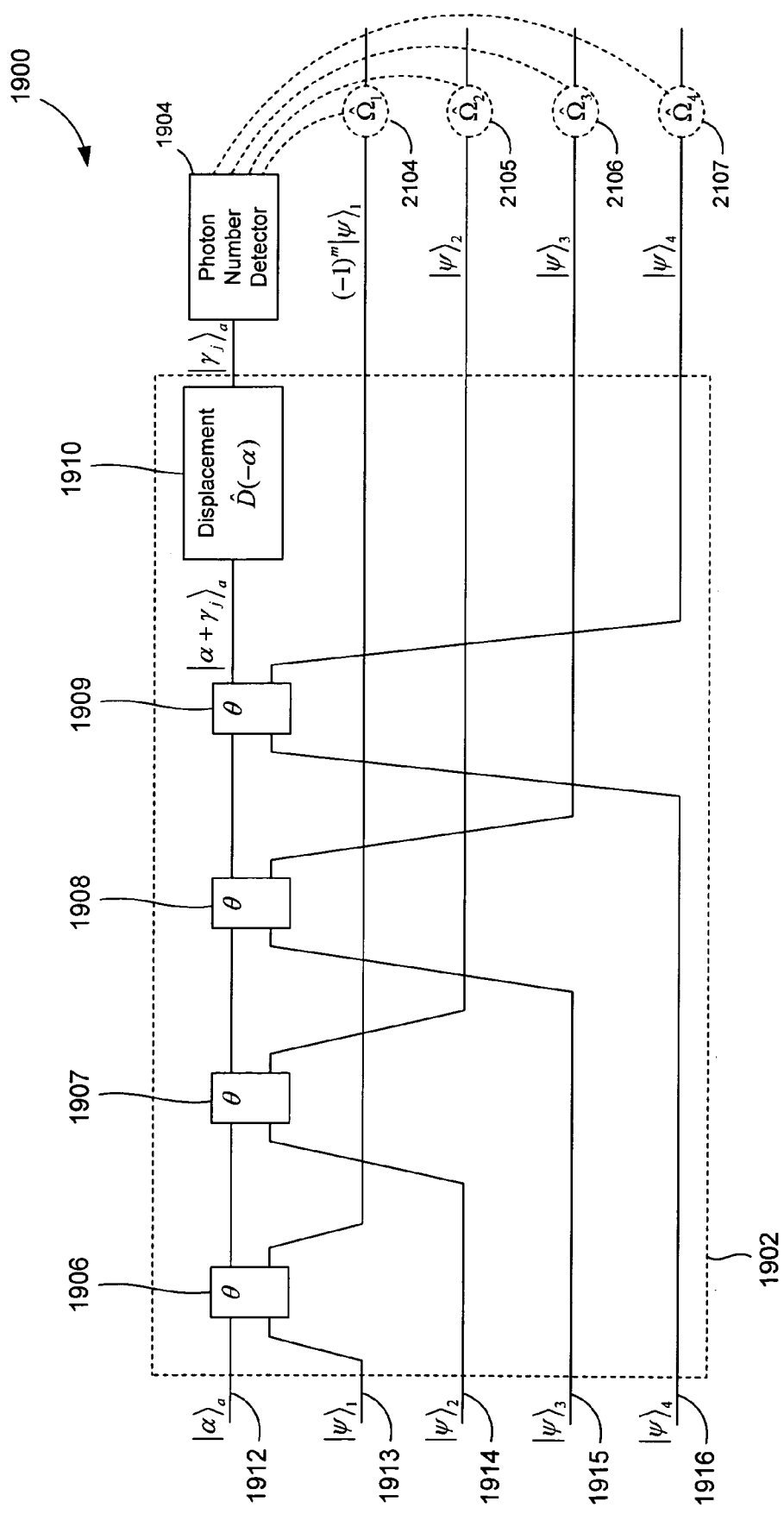

FIG. 21B illustrates a correction that removes the phase $(-1)^m$ from the entangled state $|\Phi\rangle_2$ output by the implementation 1900 and represents an embodiment of the present invention. In FIG. 21B, when the photon number detector 1904 reveals the entangled state $|\Phi\rangle_2$, the phase shift operations 2104-2107 remove the phase $\phi_2$ (x). The phase shift operations 2104-2107 are mathematically characterized by a tensor product of phase shift operators:

$$\exp\left(\frac{-im\pi}{2}\right)\hat{\Omega}_1 \otimes \hat{\Omega}_2 \otimes \hat{\Omega}_3 \otimes \hat{\Omega}_4$$

where $$\hat{\Omega}_j = \exp\left(\frac{im\pi\hat{\sigma}_{z,j}}{4}\right)$$

The phase shift operations 2104-2107 break a single qubit operation into an operation that is applied to each of the four qubits. The phase shift operations 2104-2107 applied to the entangled state $|\Phi\rangle_2$ is mathematically represented by:

$$\exp\left(\frac{-im\pi}{2}\right)\hat{\Omega}_1 \otimes \hat{\Omega}_2 \otimes \hat{\Omega}_3 \otimes \hat{\Omega}_4 \left|\Phi\right\rangle_2 = \frac{1}{8^{1/2}}\left[\begin{array}{c}(|1000\rangle + |0100\rangle + |0010\rangle + |0001\rangle) + \\ (|0111\rangle + |1011\rangle + |1101\rangle + |1110\rangle)\end{array}\right]$$

Note that no phase shift correction is needed for the state:

$$|\Sigma\rangle_3 = \frac{1}{6^{1/2}}(|1100\rangle + |1010\rangle + |1001\rangle + |0110\rangle + |0101\rangle + |0011\rangle)$$

Alternatively, the phases in the final states can be noted and tracked through any system that uses the entangled state. Note that the photon number detector 1904 absorbs the photons, and outputs a signal that can be processed by digital circuits. Photomultiplier tubes, avalanche photodiodes, and high efficiency photon detection devices, such as a visible light photon counter, can be used to determine the number of photons in the probe number states of the output state $|\Psi\rangle_{out}^{adj}$. Squaring the amplitudes of the output state $|\Psi\rangle_{out}^{PNC}$ gives the probability of outputting the entangled states $|\Phi\rangle_1$, $|\Phi\rangle_2$, and $|\Phi\rangle_3$. For example, there is a ⅛ probability of outputting the entangled state $|\Phi\rangle_1$, a ½ probability of outputting the entangled state $|\Phi\rangle_2$, and a ⅜ probability of outputting the entangled state $|\Phi\rangle_3$. In an embodiment of the present invention, the angle φ is equal to zero. Applying the time-evolution operator $\hat{U}_0$ to the input state $|\Psi\rangle_{in}$ represents operation of the interaction region 1902 and gives an output state comprising the linear superposition of states:

$$|\Psi\rangle_{out} = \hat{U}_0|\Psi\rangle_{in}$$
$$= \frac{1}{4}\left[\begin{array}{c}|\Gamma\rangle_1|\alpha+i4\theta\rangle_a + |\Gamma\rangle_2|\alpha+i2\theta\rangle_a + |\Gamma\rangle_3|\alpha\rangle_a + \\ |\Gamma\rangle_4|\alpha-i2\theta\rangle_a + |\Gamma\rangle_5|\alpha-i4\theta\rangle_a\end{array}\right]$$

Figure 22A:
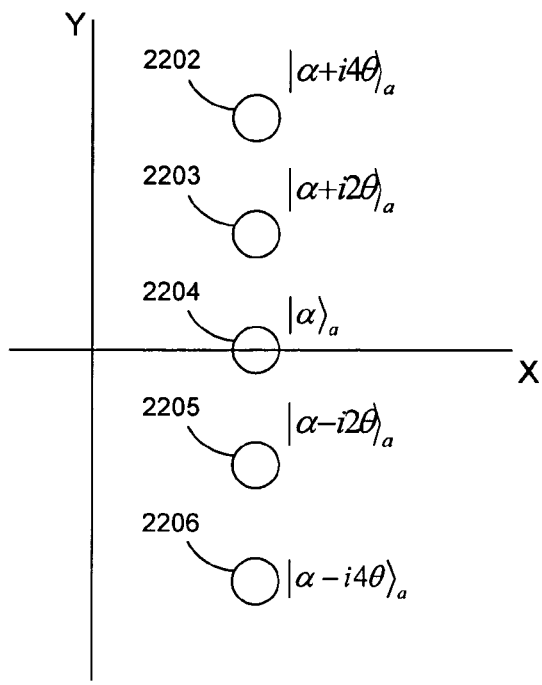
FIG. 22A is a phase-space diagram of probes entangled with basis states output from a probe-basis-state interaction region of the implementation in FIG. 19 that represents an embodiment of the present invention.

FIG. 22A is a phase-space diagram of the output state $|\Psi\rangle_{out}$. In FIG. 22A, the uncertainty disks 2202-206 are aligned vertically above and below the X-quadrature axis and correspond to the probes $|\alpha+i4\theta\rangle_a, |\alpha+i2\theta\rangle_a, |\alpha\rangle_a, |\alpha-i2\theta\rangle_a$, and $|\alpha+i4\theta\rangle_a$, respectively.

The states $|\Gamma\rangle_1$ and $|\Gamma\rangle_5$ are entangled by projecting the output state $|\Psi\rangle_{out}$ onto a linear superposition of the states $|\Gamma\rangle_1$ and $|\Gamma\rangle_5$ which is achieved by translating the probes to the Y-quadrature axis. In FIG. 19, the displacement operation 1910 translates the probes in $|\Psi\rangle_{out}$ to the Y-quadrature axis as follows:

$$|\Psi\rangle_{out}^{adj} = \hat{D}(-\alpha)|\Psi\rangle_{in}$$
$$= \frac{1}{4}\left[\begin{array}{c}|\Gamma\rangle_1|i4\theta\rangle_a + |\Gamma\rangle_2|i2\theta\rangle_a + |\Gamma\rangle_3|0\rangle_a + \\ |\Gamma\rangle_4|-i2\theta\rangle_a + |\Gamma\rangle_5|-i4\theta\rangle_a\end{array}\right]$$

Figure 22B:
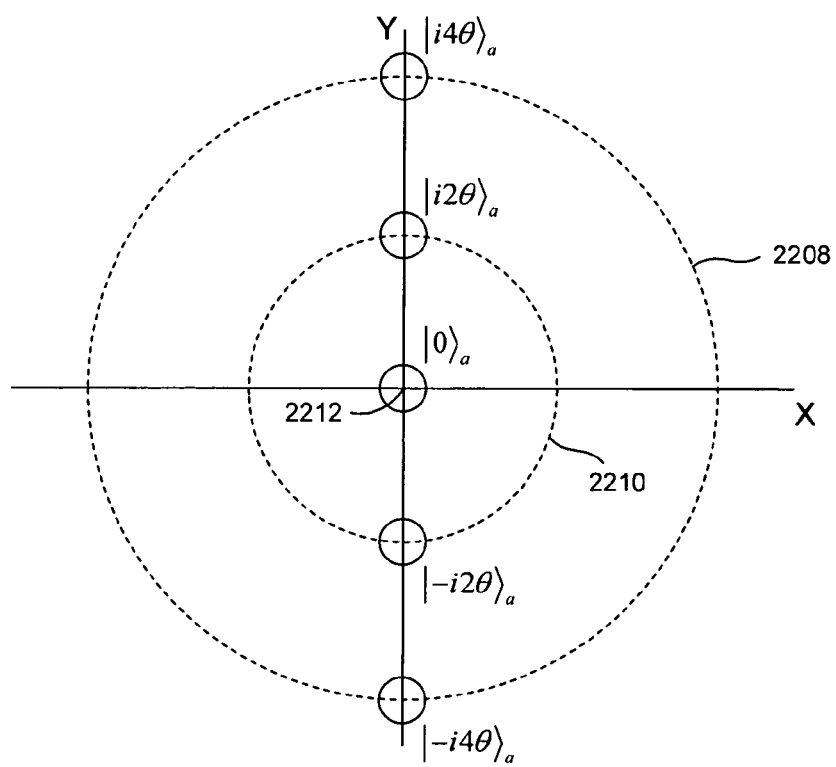
FIG. 22B is a phase-space diagram of the probes in FIG. 22A after application of a translation operation that represents one of many embodiments of the present invention.

FIG. 22B is a phase-space diagram of the phase-adjusted output state $|\Psi\rangle_{out}^{adj}$. Circle 2208 represents the probes $|i4\theta\rangle_a$ and $|-i4\theta\rangle_a$, which are both the same distance form the origin and have identical numbers of photons. Circle 2210 represents the probes $|i2\theta\rangle_a$ and $|-i2\theta\rangle_a$, which are both the same distance form the origin and have identical numbers of photons. The vacuum state $|0\rangle_a$ is located at the origin 2212.

In FIG. 19, photon number detector 1904 gives the number of photons in the probe, which projects the phase-adjusted output state $|\Psi\rangle_{out}^{adj}$ into one of the probes represented in FIG. 22B. The state output by the photon number detector 1904 is:

$$|\Psi\rangle_{out}^{PNC} = \frac{1}{2^{3/2}}|\Phi\rangle_1 + \frac{1}{2^{1/2}}|\Phi\rangle_2 + \left(\frac{3}{2}\right)^{1/2}|\Phi\rangle_3$$

which is identical to the output state described above for phase angle $\phi$ equal to $-\pi/2$.

Figure 23:
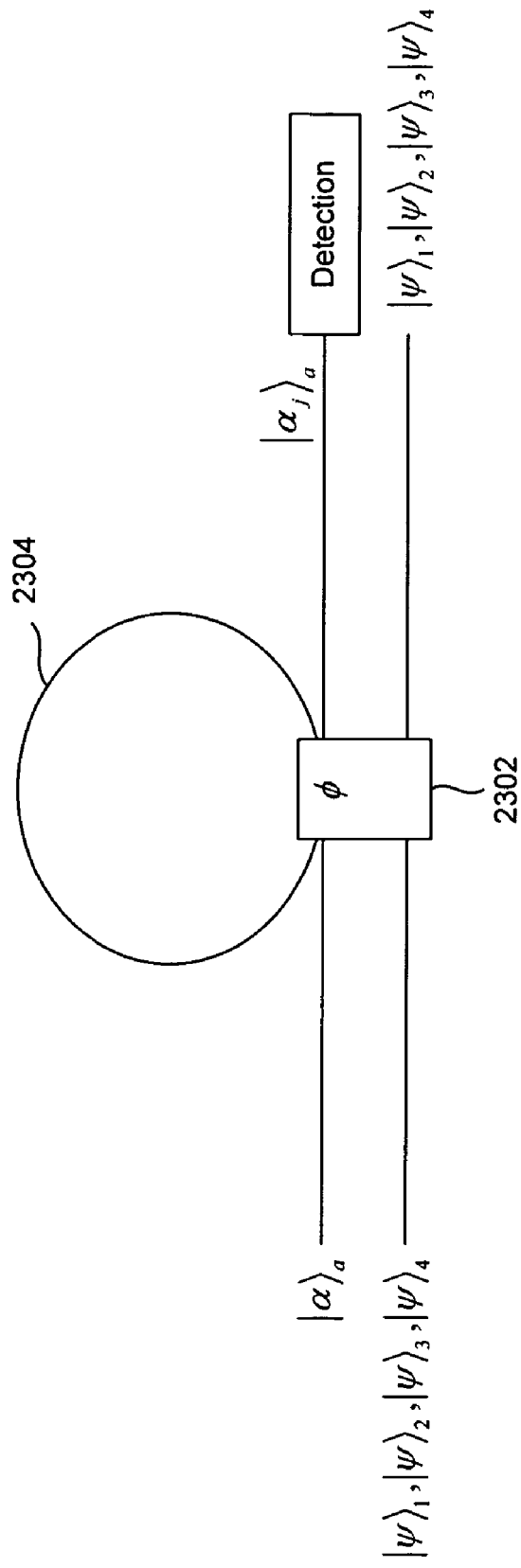
FIG. 23 illustrates an interaction region comprising a single interaction medium that represents one of many embodiments of the present invention.

Although the present invention has been described in terms of particular embodiments, it is not intended that the invention be limited to these embodiments. Modifications within the spirit of the invention will be apparent to those skilled in the art. For example, in an alternate embodiment of the present invention, rather than employing interaction regions having two or more interaction mediums as described above with reference to FIGS. 13, 16, and 19, the interaction region can have a single interaction medium. FIG. 23 illustrates an interaction region comprising a single interaction medium that represents one of many embodiments of the present invention. In FIG. 23, the probe $|\alpha\rangle_a$ is repeatedly transmitted into an interaction medium 2302 via a transmission channel 2304. Transmission of the probe into the interaction medium 2302 is synchronized with the transmission of the qubits $|\psi\rangle_1, |\psi\rangle_2, |\psi\rangle_3$, and $|\psi\rangle_4$ so that the probe interacts separately with each qubit. In an alternate embodiment of the present invention, rather than performing the displacement operation 1910, in FIG. 19, on the probe after the probe is output from the interaction region 1902, the displacement operation can be performed before the probe is input to the interaction region 1902. In an alternate embodiment of the present invention, the displacement operation 1904 can be eliminated by using the vacuum state with $\alpha$ equal to "0." In an alternate embodiment of the present invention, the use of other interaction mediums characterized by different interaction Hamiltonians can be used. In alternate embodiments of the present invention, multiple probe beams can be used to interact with subsets of qubits and then interfere at a beam-splitter prior to a measurement. In alternate embodiments of the present invention, the entangled qubits can be quantum dots, magnetic moments, such as superconducting flux or magnetic spin qubits, or the qubits can be modes of nanoelectromechanical systems. In alternate embodiments of the present invention, each of the N matter-based qubits can be trapped within one of the N separate interaction mediums in the interaction region. The probe is transmitted to each of the N interaction mediums to separately interact with the N qubits. In an alternate embodiment of the present invention, an interaction region comprises numerous different kinds of interaction mediums. For example, an interaction region comprises a combination of interaction mediums for coupling matter-based qubits to a probe and Kerr interaction mediums for coupling photon-based qubits to the probe.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for preparing an entangled state of qubits, the method comprising:
   providing a probe and N non-interacting qubits, each qubit comprises a linear superposition of two basis states;
   transmitting the probe into an interaction region that separately couples the probe to each of the qubits and produces a number of different probe states;
   outputting from the interaction region a linear superposition of states, each state in the linear superposition of states is an entangled state of tensor product basis states and one of the different probe states; and
   projecting the linear superposition of states into one of the entangled states by measuring the state of the probe.

2. The method of claim 1 wherein the probe is a coherent state and the N non-interacting qubits further comprises one or more of:
   matter-based qubits;
   photon-based qubits;
   a linear superpositions of two quantum dot states; and
   a linear superposition of two magnetic states.

3. The method of claim 1 wherein the detector is a photon number detector.

4. The method of claim 1 wherein the detector is an X quadrature homodyne detector.

5. The method of claim 1 wherein the interaction region further comprises one or more dipole coupling mediums, each medium characterized by an interaction Hamiltonian:

$$\hat{H} = \hbar\chi\hat{a}^\dagger\hat{a}\hat{\sigma}_z$$

where $\chi$ is a constant that represents the coupling strength between the probe and basis states of the qubit, $\hat{a}^\dagger \hat{a}$ is a number operator that operates on the probe, and $\hat{\sigma}_z = |0\rangle\langle 0| - |1\rangle\langle 1|$.

6. The method of claim 1 wherein the interaction region further comprises one or more cross-Kerr interaction mediums, each medium characterized by a cross-Kerr interaction Hamiltonian:

$$\hat{H} = \hbar\chi \hat{a}^\dagger \hat{a} \hat{b}^\dagger \hat{b}$$

where $\chi$ is a constant that represents the coupling strength between the probe and basis states of the qubit,
$\hat{a}^\dagger \hat{a}$ is a number operator that operates on the probe, and
$\hat{b}^\dagger \hat{b}$ is a number operator that operates on a photon basis state.

7. The method of claim 1 wherein the interaction region further comprises one or more interaction mediums, each medium characterized by an interaction Hamiltonian:

$$\hat{H} = \hbar\chi \hat{\sigma}_z (\hat{a}^\dagger e^{i\phi} + \hat{a} e^{-i\phi})$$

where $\chi$ is a constant that represents the coupling strength between the probe and basis states of the qubit,
$\hat{\sigma}_z = |0\rangle\langle 0| - |1\rangle\langle 1|$, and
$\hat{a}^\dagger e^{i\phi} + \hat{a} e^{-i\phi}$ is a quadrature operator of the probe and is determined by the angle $\phi$.

8. The method of claim 1, wherein the method further comprises a correction operation that removes phase shifts acquired by the entangled states.

9. A method for preparing an entangled state of qubits, the method comprising:
providing a probe and N non-interacting qubits, each qubit comprises a linear superposition of two basis states;
transmitting the probe into an interaction region that separately couples the probe to each of the qubits and produces a number of different phase-shifted probe states;
outputting from the interaction region a linear superposition of states, each state in the linear superposition of states is an entangled state of tensor product basis states and one of the phase-shifted probe states; and
transmitting the phase-shifted probe state to a homodyne detector that projects the linear superposition of states into one of the entangled states by measuring the state of the coherent state.

10. The method of claim 9, wherein the probe is a coherent state and the N non-interacting qubits further comprises one or more of:
matter-based qubits;
photon-based qubits;
a linear superpositions of two quantum dot states; and
a linear superposition of spin magnetic moments.

11. The method of claim 9, wherein the detector is an X quadrature homodyne detector.

12. The method of claim 9, wherein the interaction region further comprises dipole coupling mediums, each medium characterized by an interaction Hamiltonian:

$$\hat{H} = \hbar\chi \hat{a}^\dagger \hat{a} \hat{\sigma}_z$$

where $\hat{a}^\dagger \hat{a}$ is a number operator that operates on the probe,
$\chi$ is a constant that represents the coupling strength between the probe and basis states of the qubit, and
$\hat{\sigma}_z = |0\rangle\langle 0| - |1\rangle\langle 1|$.

13. The method of claim 9, wherein the interaction region further comprises cross-Kerr interaction mediums, each medium characterized by a cross-Kerr Hamiltonian:

$$\hat{H} = \hbar\chi \hat{a}^\dagger \hat{a} \hat{b}^\dagger \hat{b}$$

where $\chi$ is a constant that represents the coupling strength between the probe and basis states of the qubit,
$\hat{a}^\dagger \hat{a}$ is a number operator that operates on the probe, and
$\hat{b}^\dagger \hat{b}$ is a number operator that operates on a photon basis state.

14. The method of claim 13, wherein the interaction region further comprises applying a quadrature rotation operation to the probe output from the interaction region.

15. The method of claim 9, wherein the method further comprises a correction operation that removes phase shifts acquired by the entangled states.

16. A method for preparing an entangled state of qubits, the method comprising:
providing a probe and N non-interacting qubits, each qubit comprises a linear superposition of two basis states;
transmitting the probe into an interaction region that separately couples the probe to each of the qubits and produces a number of different translated coherent states;
outputting from the interaction region a linear superposition of states, each state in the linear superposition of states is an entangled state of tensor product basis states and one of the translated probe states; and
transmitting the displaced probe state to a photon number detector that projects the linear superposition of states into one of the entangled states by measuring the state of the coherent state.

17. The method of claim 16 wherein the probe is a coherent state and the N non-interacting qubits further comprise one or more of:
matter-based qubits;
a linear superpositions of two quantum dot states; and
a linear superposition of spin magnetic moments.

18. The method of claim 16 wherein the detector is a photon number detector.

19. The method of claim 16 wherein the interaction region further comprises one or more interaction mediums, each medium characterized by an interaction Hamiltonian:

$$\hat{H} = \hbar\chi \hat{\sigma}_z (\hat{a}^\dagger e^{i\phi} + \hat{a} e^{-i\phi})$$

where $\chi$ is a constant that represents the coupling strength between the probe and basis states of the qubit,
$\hat{\sigma}_z = |0\rangle\langle 0| - |1\rangle\langle 1|$, and
$\hat{a}^\dagger e^{i\phi} + \hat{a} e^{-i\phi}$ is a quadrature operator of the probe and is determined by the angle $\phi$.

20. The method of claim 19, wherein the interaction region further comprises applying a probe displacement operation to the probe output from the interaction region.

21. The method of claim 16, wherein the method further comprises a correction operation that removes phase shifts acquired by the entangled states.

* * * * *

UNITED STATES PATENT AND TRADEMARK OFFICE
CERTIFICATE OF CORRECTION

| | | |
|---|---|---|
| PATENT NO. | : 7,836,007 B2 | Page 1 of 1 |
| APPLICATION NO. | : 11/343639 | |
| DATED | : November 16, 2010 | |
| INVENTOR(S) | : Raymond G. Beausoleil et al. | |

It is certified that error appears in the above-identified patent and that said Letters Patent is hereby corrected as shown below:

In column 37, line 17, in Claim 7, delete " $\hat{H}=\hbar\chi\hat{\sigma}_z(\hat{a}^\dagger e^{i\phi}+\hat{a}e^{-\phi})$ ," and insert -- $\hat{H} = \hbar\chi\hat{\sigma}_z\left(\hat{a}^\dagger e^{i\varphi} + \hat{a}e^{-i\varphi}\right)$ --, therefor.

In column 38, line 44, in Claim 19, delete " $\hat{H}=\hbar\chi\hat{\sigma}_z(\hat{a}^\dagger e^{i\phi}+\hat{a}e^{-\phi})$ ," and insert -- $\hat{H} = \hbar\chi\hat{\sigma}_z\left(\hat{a}^\dagger e^{i\varphi} + \hat{a}e^{-i\varphi}\right)$ --, therefor.

Signed and Sealed this
Twenty-ninth Day of March, 2011

David J. Kappos
*Director of the United States Patent and Trademark Office*